United States Patent

Tanaka et al.

[11] Patent Number: 6,101,596
[45] Date of Patent: Aug. 8, 2000

[54] INFORMATION PROCESSOR FOR PERFORMING PROCESSING WITHOUT REGISTER CONFLICTS

[75] Inventors: Shigeya Tanaka; Kotaro Shimamura, both of Hitachi; Tetsuya Shimomura; Takashi Hotta, both of Hadano; Hideo Sawamoto, Machida, all of Japan

[73] Assignee: Hitachi, Ltd., Tokyo, Japan

[21] Appl. No.: 08/894,924

[22] PCT Filed: Mar. 6, 1995

[86] PCT No.: PCT/JP95/00356

§ 371 Date: Sep. 3, 1997

§ 102(e) Date: Sep. 3, 1997

[87] PCT Pub. No.: WO96/27833

PCT Pub. Date: Sep. 12, 1996

[51] Int. Cl.[7] ................................... G06F 9/00
[52] U.S. Cl. .................. 712/216; 712/41; 712/210; 712/215; 712/216; 712/217; 712/218
[58] Field of Search .................... 395/393, 375, 395/182.05, 263, 800.3, 555; 364/937.01, 943.9, 944.6, 947, 947.4, 231.8, 263, 263.1, 948.3, 245.3, 244.5, 247, 319, 933.6; 712/41, 210, 215–218

[56] References Cited

U.S. PATENT DOCUMENTS

| | | | |
|---|---|---|---|
| 4,875,160 | 10/1989 | Brown, III | 712/228 |
| 5,142,631 | 8/1992 | Murray et al. | 395/393 |
| 5,167,026 | 11/1992 | Murray et a. | 395/386 |
| 5,276,822 | 1/1994 | Maekawa et al. | 395/394 |
| 5,471,591 | 11/1995 | Edmondson et al. | 712/217 |
| 5,488,730 | 1/1996 | Brown, III et al. | 395/800.41 |
| 5,632,023 | 5/1997 | White et al. | 712/218 |
| 5,761,475 | 6/1998 | Yung et al. | 395/394 |

*Primary Examiner*—Meng-Ai T. An
*Assistant Examiner*—Nabil El-Hady
*Attorney, Agent, or Firm*—Antonelli, Terry, Stout & Kraus, LLP

[57] ABSTRACT

An information processor is capable of eliminating register conflict in short and long latency processes and for attaining high-speed pipeline processing through efficient use of registers. The scale of the necessary hardware is reduced by the processor using a register conflict detector and a scoreboard. The register conflict detector detects register conflict over a period of short latency processing, and the scoreboard checks for register conflict beyond the short latency process period and into a period of long latency processing. The processor controls the issue of instructions based on the detected register conflict status.

2 Claims, 21 Drawing Sheets

FIG.9

| INSTRUCTION MNEMONIC | OPERATION | INSTRUCTION CODE |
|---|---|---|
| FMUL r1,r2,r3 | r1 × r2 → r3 | op \| 0 \| r3 \| r2 \| r1 |
| FADD r1,r2,r3 | r1 × r2 → r3 | op \| 0 \| r3 \| r2 \| r1 |
| FLD GR1,disp,r3 | CONTENT AT ADDRESS (GR1+disp) → r3 | op \| 0 \| r3 \| GR1 \| disp |
| FST r1,GR1,disp | r1 → ADDRESS (GR1+disp) | op \| 0 \| r1 \| GR1 \| disp |
| FPLD GR1,disp,r3' | CONTENT AT ADDRESS (GR1+disp) → r3' | op \| r3' \| GR1 \| disp |
| FPST r1',GR1,disp | r1' → ADDRESS (GR1+disp) | op \| r1' \| GR1 \| disp |
| FWP disp1 | WIDOW SWITCHOVER (disp1 → WP) | op \| 0 \| disp1 |

EACH OF r1, r2 AND r3 DENOTES FIVE-BIT INFORMATION AND MAY SELECT UP TO 32 REGISTERS.
EACH OF r3' AND r1' REPRESENTS SEVEN-BIT INFORMATION AND MAY SELECT UP TO 128 REGISTERS.

INFORMATION PROCESSOR FOR PERFORMING PROCESSING WITHOUT REGISTER CONFLICTS

BACKGROUND OF THE INVENTION

The present invention relates to an information or data processor that processes and executes instructions on a pipeline basis. More particularly, the invention relates to an information or data processor (simply called an information processor hereunder) for processing information or data in an environment where short and long latency processes are mixed.

The biggest constraint on instruction control by an information processor that processes instructions on a pipeline basis as programmed is that the processor must execute the instructions in a sequence consistent with the software-designated instruction execution order.

Typical pipeline-processing information processors perform what may be termed basic pipeline processing having each instruction completed in about three to five cycles. In this type of processing, instruction execution may be carried out one cycle at a time (called short latency processing hereunder).

The instructions are not limited to short latency processing alone; some instructions are complicated and take some time to execute (called long latency processing hereunder). The complicated or time-consuming instructions illustratively represent divisions and main memory access operations. This makes it difficult to meet the above consistency requirement at all times.

There have been proposed ways to bypass the above constraint regardless of the duration of pipeline processing being short or long, i.e., irrespective of short or long latency processes being carried out.

The simplest way to satisfy the requirement of instruction execution sequence consistency is that, when an instruction performs a process other than a basic pipeline process, all subsequent instructions are kept from proceeding to execution (the scheme is called the interlock method).

The following series of instructions will be discussed below as an example:

FDIV r6, r7, r8     (1)

FADD r1, r2, r3     (2)

FSUB r3, r4, r5     (3)

If the instruction (1) turns out to have a long execution cycle (i.e., a long latency process instruction) when executed, then the interlock method causes the instruction (2) and all subsequent instructions to be interlocked.

Alternatively, if the instructions (2) and (3) are independent of the outcome of the instruction (1), the two instructions may be executed ahead of the latter to enhance execution performance. This method involves using a detector that checks during execution of the instruction (1) to see if the subsequent instructions are dependent on the result of the execution of the instruction (1). If the subsequent instructions are found to be independent of the ongoing instruction, these instructions are executed without delay. If the subsequent instructions are found to be dependent on the outcome of the ongoing instruction, processing is allowed to proceed up to the currently executed instruction, the dependent instructions are interlocked therewith. These methods are implemented so as to process instructions in a consistent sequence.

Of particular importance regarding instruction dependency is a possible conflict that may occur between general registers. There are two representative ways to detect register conflict. One way is to compare the number of the register holding the instruction for each pipeline with the numbers of the registers accommodating instructions to be subjected to pipeline processing. The other way to detect possible register conflict is the use of what is known as a scoreboard.

A scoreboard comprises a bit indicating the number of the register accommodating the instruction currently treated in pipeline processing; setting means for setting the bit to 1; and resetting means for resetting the bit to 0. A register conflict is detected by the scoreboard checking to see whether the bit corresponding to the register for an instruction to be put to pipeline processing is 1 or 0.

The method for interlocking instructions upon comparison of register numbers, i.e., a first conventional method, is discussed illustratively in Japanese Patent Laid-Open No. Hei 5-298091. The publication discloses an information processor based on this method whereby, with a load instruction waiting for data to arrive from memory, arithmetic instructions subsequent to the load instruction are executed before termination of the ongoing instruction if no register conflict exists between the load instruction and the subsequent instructions.

The information processor according to the first conventional method includes a register for holding a load instruction as long as that instruction is being processed. The number of that register holding the load instruction is compared by a comparator with those registers accommodating instructions to be subjected to pipeline processing. The comparison reveals whether any register conflict can occur.

The scoreboard-based method, i.e., a second conventional method, is disclosed illustratively in Japanese Patent Laid-Open No. Hei 5-108348. In the case of a cache miss with a load instruction (a long latency process), this method causes subsequent arithmetic instructions to be carried out concurrently so as to minimize the unnecessary waiting time of the latter instructions. According to the second conventional method, a load instruction is entered into the scoreboard when its pipeline processing has started and is removed from the scoreboard when the instruction execution has ended. The bit representing the register which accommodates the instruction currently handled in pipeline processing is set to 1. The bit settings are checked to detect a register conflict between the load instruction and the subsequent instructions.

A main memory access operation, which is a typical long latency process, will now be described.

The main memory access operation typically takes about 400 ns to complete. If one machine cycle is 10 ns, the latency involved amounts to 40 cycles. This poses a bottleneck in terms of computer (i.e., information processor) performance.

There have been proposed methods for speeding up the main memory access operation. They primarily involve subjecting the access operation to pipeline processing.

One such method, i.e., a third conventional method, is a memory access pipeline processing method that uses a memory arrangement made up of a plurality of banks interleaved in units of words. The memory arrangement constitutes a so-called interleaving memory designed for better performance of the main memory. The method is discussed illustratively by John L. Hennessy and David A. Patterson in "Computer Architecture," Chapter 8, "Designing Memory Hierarchy."

The purpose of setting up a plurality of memory banks is twofold: to permit continuous access operations and to allow a plurality of independent access operations.

However, access operations to independent memory banks can result in a bank conflict. That is, while a given memory bank is being accessed, there may arrive a request to access the same bank. The resulting bank conflict causes subsequent access requests to wait in an input buffer.

Illustratively, suppose that there are access requests 1, 2, 3 and 4 and that access requests 1 and 2 lead to a bank conflict. In such a case, the access requests are serviced and finished in the order of requests 1, 3, 4 and 2.

In other words, the output of the interleaving memory does not maintain the original sequence of processing requests. When finished, the requests may have changed their sequence. Furthermore, processing cycles may be varied.

Thus, the information processor having an interleaving memory (based on the third conventional method) is required to have suitable arrangements to make sure that the sequence of instruction execution requests from an instruction processing unit matches the sequence of instruction execution responses from a memory controller. Specifically, the memory controller has an output buffer in which to retain access requests 3 and 4 beforehand so that after execution of access request 2, access requests 3 and 4 are sent in that order to the instruction processing unit.

One disadvantage of the first conventional method, i.e., a first disadvantage of the prior art, is that with the instruction register filled with the ongoing instruction, an incoming load instruction (a long latency process) causes all subsequent instructions to be interlocked (in a hold register conflict). This makes it impossible to continue pipeline processing. In other words, pipeline processing is disabled depending on the status of the instruction-holding register numbers.

Another disadvantage of the first conventional method, i.e., a second disadvantage of the prior art, is that where a plurality of registers are used to hold numerous instructions for pipeline processing, a plurality of comparators are needed to compare the multiple register numbers which were given to each register. The result is a considerable enlargement of the scale of the necessary hardware.

One disadvantage of the second conventional method, i.e., a third disadvantage of the prior art, is the need for complicated control logic for consistent pipeline processing control. Since applicable entries are made into the scoreboard as soon as instructions are input to the pipeline, the scoreboard status must be controlled through monitoring of each pipeline process, especially when a branch instruction or interrupt handling disrupts pipeline processing and nullifies the load instruction.

One disadvantage of the third conventional method, i.e., a fourth disadvantage of the prior art, is the presence of an excessive overhead. With an interleaving memory in use, the information processor based on the third conventional method still retains access requests 3 and 4 in its output buffer although the servicing of access requests 3 and 4 has been completed. This leads to a register conflict in the instruction processing unit between access request 3 or 4 and a subsequent instruction subjected to pipeline processing. In that case, an increased overhead results from the excess interlock with the cycles needed for the memory controller to ensure the proper sequence of instruction execution.

SUMMARY OF THE INVENTION

It is therefore an object of the present invention to provide an information processor which is capable of full pipeline processing regardless of the status of instruction-holding register numbers.

It is another object of the invention to provide an information processor which calls for a minimum increase in the scale of its hardware in order to subject numerous instructions to pipeline processing.

It is a further object of the invention to provide an information processor for accomplishing pipeline control based on a simplified control theory.

It is an even further object of the invention to provide an information processor for ensuring the performance of long latency processing in which processing cycles are varied, without guaranteeing sequential consistency between process requests and their results, whereby any excess overhead stemming mainly from register conflict is reduced.

In carrying out the invention and according to one aspect thereof, there is provided an information processor comprising: a short latency processing unit for performing short latency processing by executing an instruction in n cycles in pipeline processing, n being an integer of at least 1; a register conflict detector for detecting a register conflict between a short latency process instruction being processed by the short latency processing unit and a subsequent instruction to be subjected to pipeline processing; a long latency processing unit for performing long latency processing by executing an instruction in m cycles in pipeline processing, m being an integer larger than n; a long latency process detector for verifying whether the instruction is a long latency process instruction; and a register conflict scoreboard for detecting a register conflict between a long latency process instruction being processed over a period ranging from the (K+1)th cycle to the m-th cycle, on the one hand, and a subsequent instruction to be subjected to pipeline processing, on the other hand, K being an integer larger than n and smaller than m, the register conflict scoreboard further updating information indicating whether an applicable register is being used in the ongoing processing; wherein, given an instruction, the register conflict detector checks for a register conflict until K cycles of the given instruction elapse, the register conflict detector further sets the use of an applicable register to the register conflict scoreboard before elapse of (K+1) cycles when the long latency process detector finds the given instruction to be a long latency process instruction, and the register conflict detector further checks for register conflict till the end of the execution of the long latency process instruction.

According to another aspect of the invention, there is provided an information processor comprising: an instruction processing unit for performing short latency processing by reading data read from an internal memory in accordance with an instruction, by subjecting the read data to a pipeline process executed in n cycles and by storing the processed data into the internal memory, n being an integer of at least 1; a register conflict detector for detecting a register conflict between a short latency process instruction being processed by the instruction processing unit and a subsequent instruction to be subjected to pipeline processing; a memory processing unit for performing long latency processing by reading data from an external memory in accordance with an instruction, by subjecting the read data to a pipeline process executed in m cycles and by storing the processed data in the internal memory, m being an integer larger than n; a long latency process detector for verifying whether a given instruction is a long latency process instruction whereby data is to be read from the external memory; a register conflict scoreboard for detecting a register conflict between a long latency process instruction being processed over a period ranging from the (K+1)th cycle to the m-th cycle, on the one hand, and a subsequent instruction to be subjected to pipeline processing, on the other hand, K being an integer larger than n and smaller than m, the register conflict scoreboard further updating information indicating whether an applicable register is being used in the ongoing processing; and an interface unit for transferring a request signal, an external memory address signal, an internal memory address signal, a response signal, and data coming from the external memory, the request signal being issued to read data from the instruction processing unit for transfer to the memory processing unit, the external memory address signal indicating a location of storage in the external memory, the internal memory address signal indicating a location of storage in the internal memory, the response signal being issued to the instruction processing unit by the memory processing unit acknowledging the receipt of the request signal; wherein, given an instruction, the register conflict detector checks for a register conflict until K cycles of the given instruction elapse, the register conflict detector further sets conflict information to the register conflict scoreboard corresponding to a proper register before elapse of (K+1) cycles when the long latency process detector finds the given instruction to be a long latency process instruction, the register conflict detector further resets the conflict information in the register conflict scoreboard after elapse of m cycles, and the register conflict detector further checks for a register conflict till the end of the execution of the long latency process instruction for reading data from the external memory.

The register conflict detector, i.e., the primary means for implementing the invention, detects a register conflict between any instruction to be subjected next to pipeline processing and all instructions up to the elapse of n cycles. This makes it possible to start executing pipeline processes consecutively over a period excluding long latency processing and free of register conflict.

The register conflict scoreboard, i.e., another means for implementing the invention, detects a register conflict between an instruction being processed over a period ranging from the (K+1)th cycle to the m-th cycle, on the one hand, and a subsequent instruction to be subjected to pipeline processing, on the other hand. This makes it possible to start executing pipeline processes successively over a long latency process period free of register conflict.

Two long latency process instructions may be executed in pipeline processing as long as there is no register conflict therebetween.

The register conflict detector controls pipeline processing over a period where pipeline control is likely to be disturbed by a branch instruction or interrupt handling (i.e., from the first to the K-th cycle); and the register conflict scoreboard controls pipeline processing over a period where pipeline control remains stable (i.e., from the (K+1)th to the m-th cycle). This feature permits full pipeline control of long latency processing with simplified control logic while minimizing any increase in the scale of the necessary hardware.

Within the interface unit, request and response signals are processed asynchronously. This allows long latency process instructions (in which the response signal sequence can vary) to start executing pipeline processes successively over a period where register conflict is absent during long latency processing. Furthermore, the interface unit, which does not ensure the consistency of an instruction execution sequence, eliminates an excess interlock in the case of register conflict between the completed instruction and any subsequent instruction to be subjected to pipeline processing inside an instruction controller, whereby the overhead of pipeline processing is reduced.

BRIEF DESCRIPTION OF DRAWINGS

FIG. 9 is a table listing instruction sets for use with the present invention;

DESCRIPTION OF THE PREFERRED EMBODIMENTS

Figure 19:
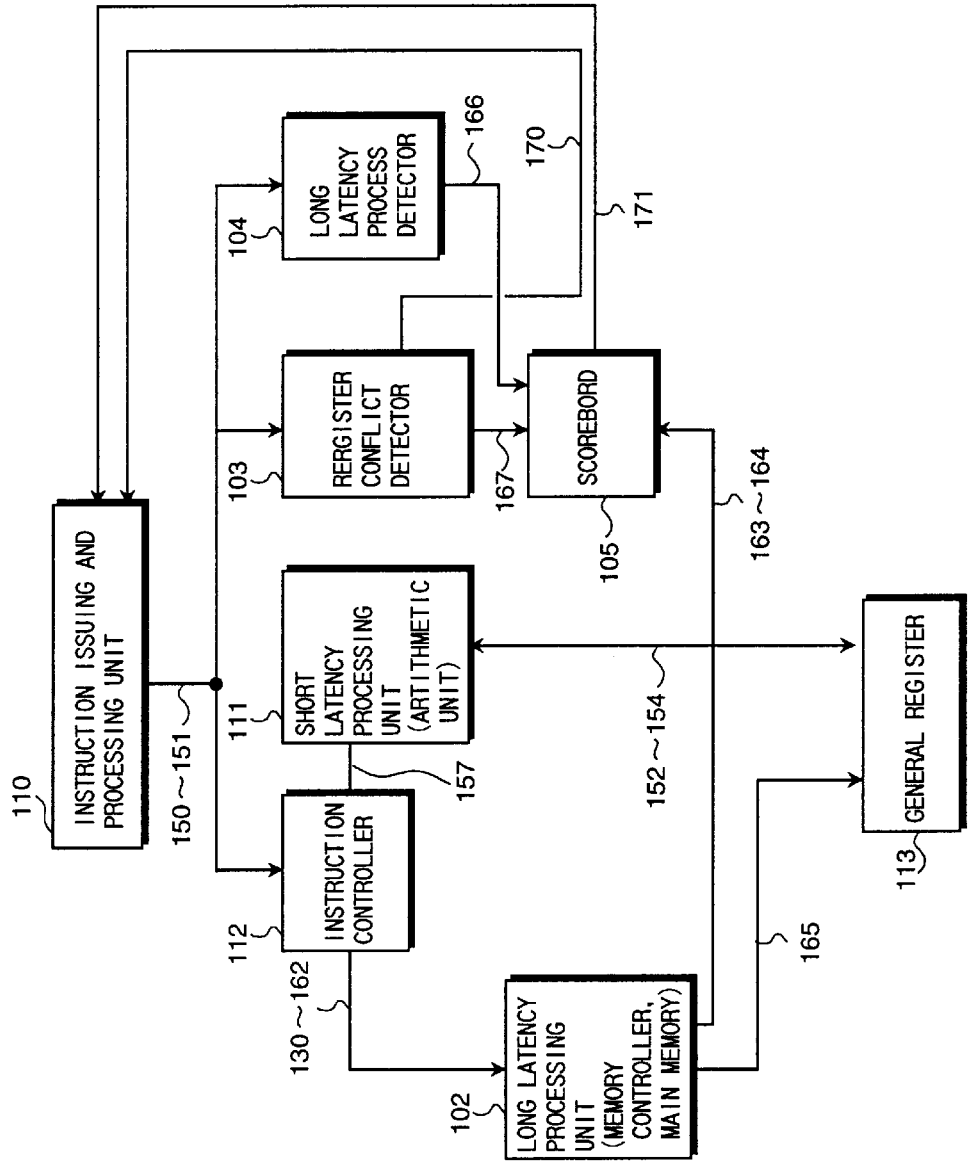
FIG. 19 is a block diagram of an information processor embodying the invention.

FIG. 19 shows a computer embodying the invention. The computer may be either for scientific and technical computation or for general purpose use.

In the computer of FIG. 19, an instruction issuing and processing unit 110 supplies instructions to an instruction controller 112, a register conflict detector 103 and a long latency process detector 104 over lines 150 and 151.

If a given instruction is found to designate a short latency process, the instruction controller 112 controls a short latency processing unit 111 using a control signal 157 to read data from a general register 113. The read-out data is operated on and the processed data is placed back in the general register 113.

If the instruction is found to designate a long latency process, the instruction controller 112 controls a long latency processing unit 102 using control signals 160 through 162 to place data into the general register 113 via line 165.

The general register 113 may be one accommodating a plurality of data items. In that case, the register is suitably divided and the register divisions are given register numbers for identifying different data items placed therein. Alternatively, the general register 113 may be composed of a group of registers. Such registers are deemed to constitute a facility called an internal memory inside the processor. A main memory or like facility outside the processor is called an external memory.

A register conflict that may occur in the short or long latency processing units will result in an erroneous operation. That eventuality is averted by the register conflict detector 103, which checks for any register conflict over a period of the short latency processing cycles.

If any register conflict is detected, the register conflict detector generates a signal 170 causing the instruction issuing and processing unit 110 to stop or suspend the issue of further instructions.

A scoreboard 105 holds and updates information about register usage. The purpose of this facility is to detect register conflict beyond the period of the short latency processing cycles and into a period of the long latency processing cycles.

Upon detecting a long latency process, the long latency process detector 104 outputs a signal 166 to the scoreboard 105 to set a register usage therein. Because the scoreboard 105 operates in collaboration with the register conflict detector 103, the long latency process detector 104 is controlled so as to complete the setting of register usage in the scoreboard 105 before a short cycle process is finished.

If a register conflict occurs after entry of the setting into the scoreboard 105, the scoreboard generates a signal 171 causing the instruction issuing and processing unit 110 to stop issuing further instructions. This prevents any faulty operation that would otherwise result from the register conflict.

When the long latency process is completed, the long latency processing unit 102 resets the register usage information by sending signals 163 and 164 to the scoreboard 105. If there are a plurality of registers, the usage information is set and reset corresponding to the register numbers.

In a register conflict during a long latency processing, over a period of the short latency cycles where pipeline control is likely to be disturbed, the register conflict detector a works to detect register conflict; and beyond that period and into one in which the pipeline control remains stable, the scoreboard 105 acts to detect a register conflict. This enables full pipeline control of long latency processes with simplified control logic while minimizing any increase in the scale of the necessary hardware.

The interface unit of this processor need not guarantee the sequential consistency of response signals 163 through 165 generated in response to request signals 160 through 162 sent to the long latency processing unit 102. Specifically, the signals 162 and 164 indicating registers (i.e., specifying register numbers) make up register designation information that is handled together with data inside the long latency processing unit. It follows that the processes involved are clearly identified without the guarantee of signal sequence consistency. Furthermore, the instruction sequence remains consistent because the scoreboard information is updated by the response signal 164 specifying registers.

As described, the interface unit is not required to make sure that request signals sent to the long latency processing unit and the response signals (i.e., processing end signal) returned from the long latency processing unit remain consistent in sequence. This in turn guarantees the performance of long latency processing of variable processing cycles, whereby the overhead stemming primarily from register conflict is reduced.

Figure 1:
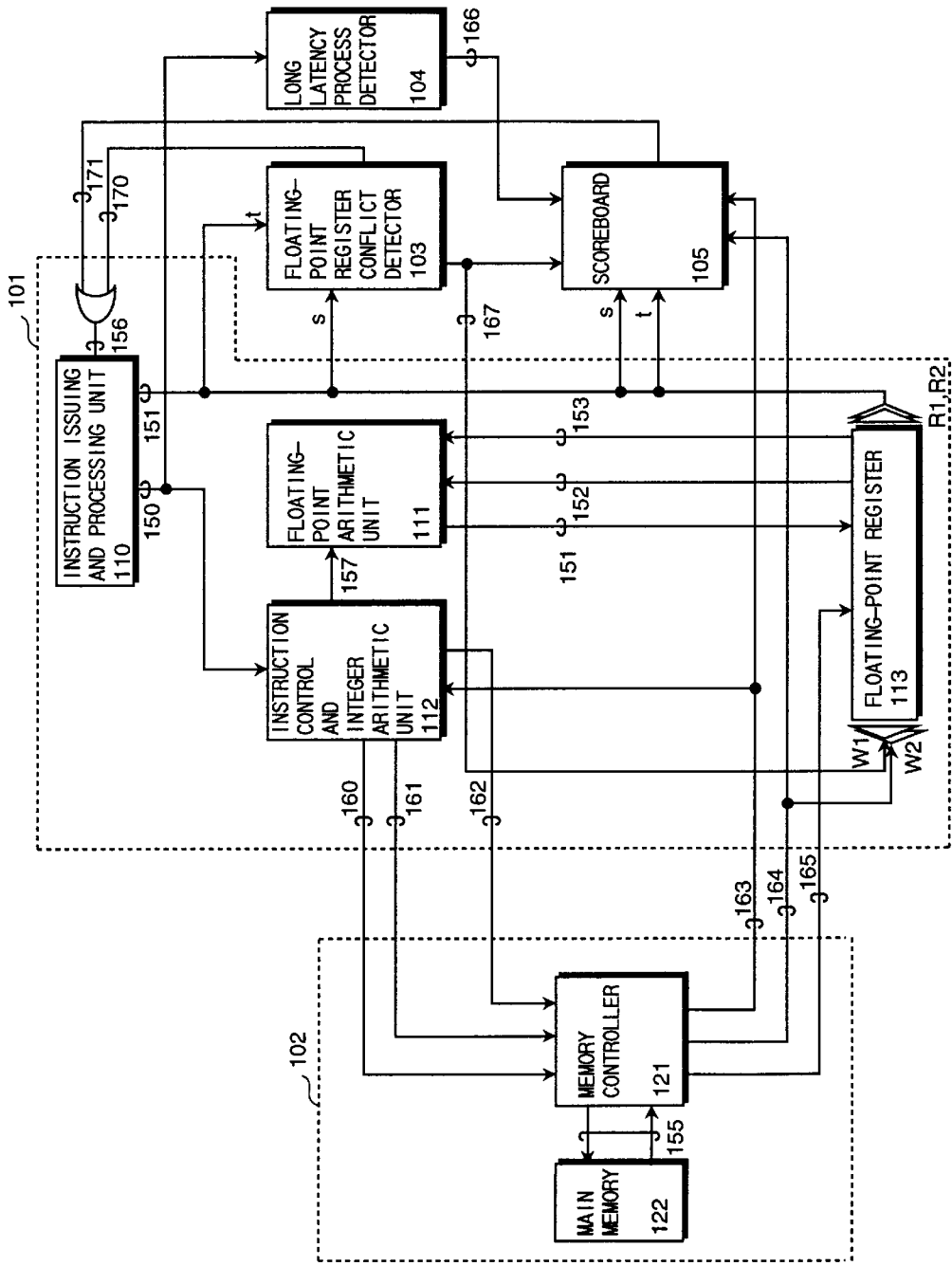
FIG. 1 is a block diagram showing the overall constitution of a computer for scientific and technical computation.
Figure 2:
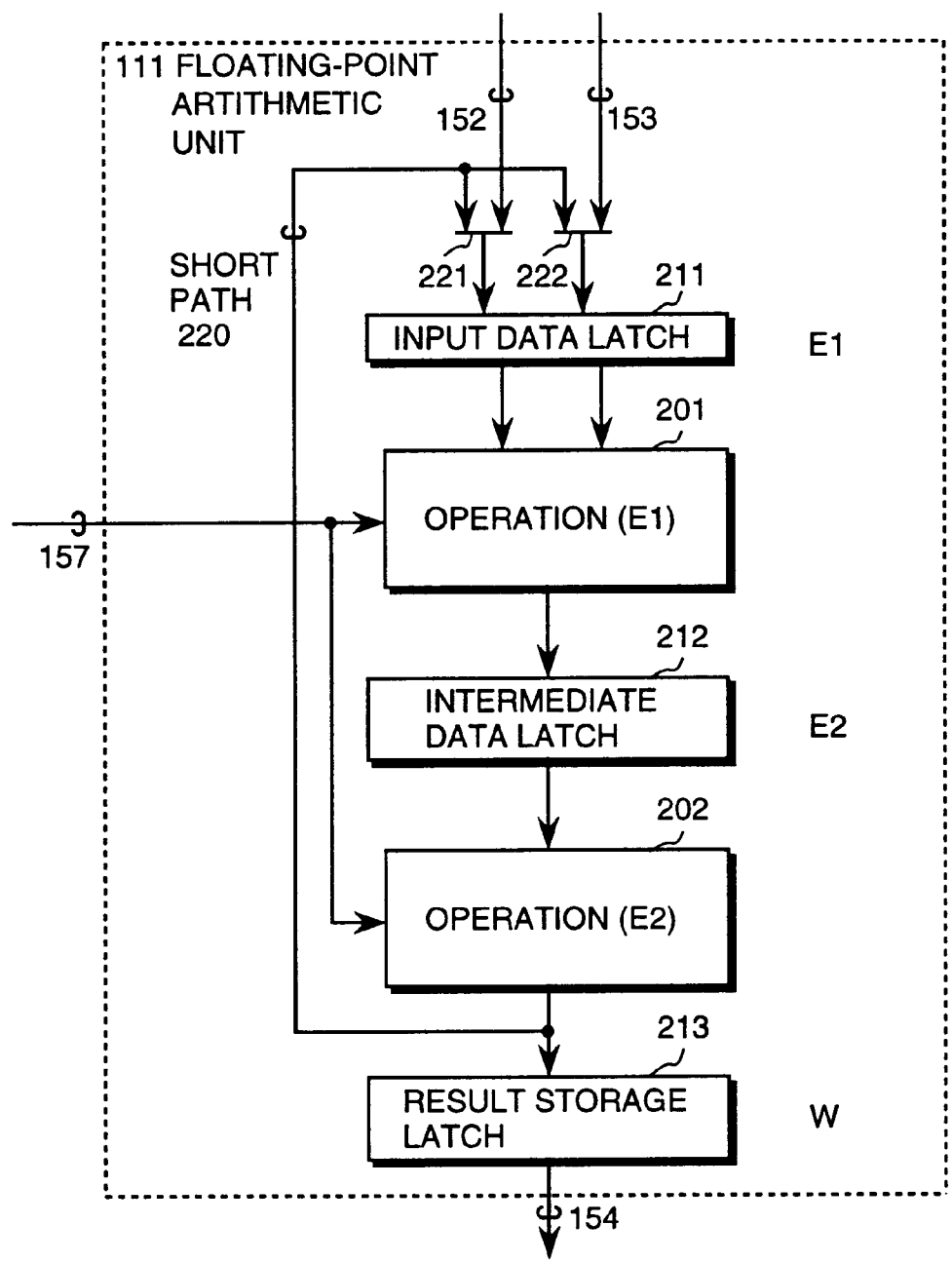
FIG. 2 is a circuit diagram showing an example constitution of a floating-point arithmetic unit.
Figure 3:
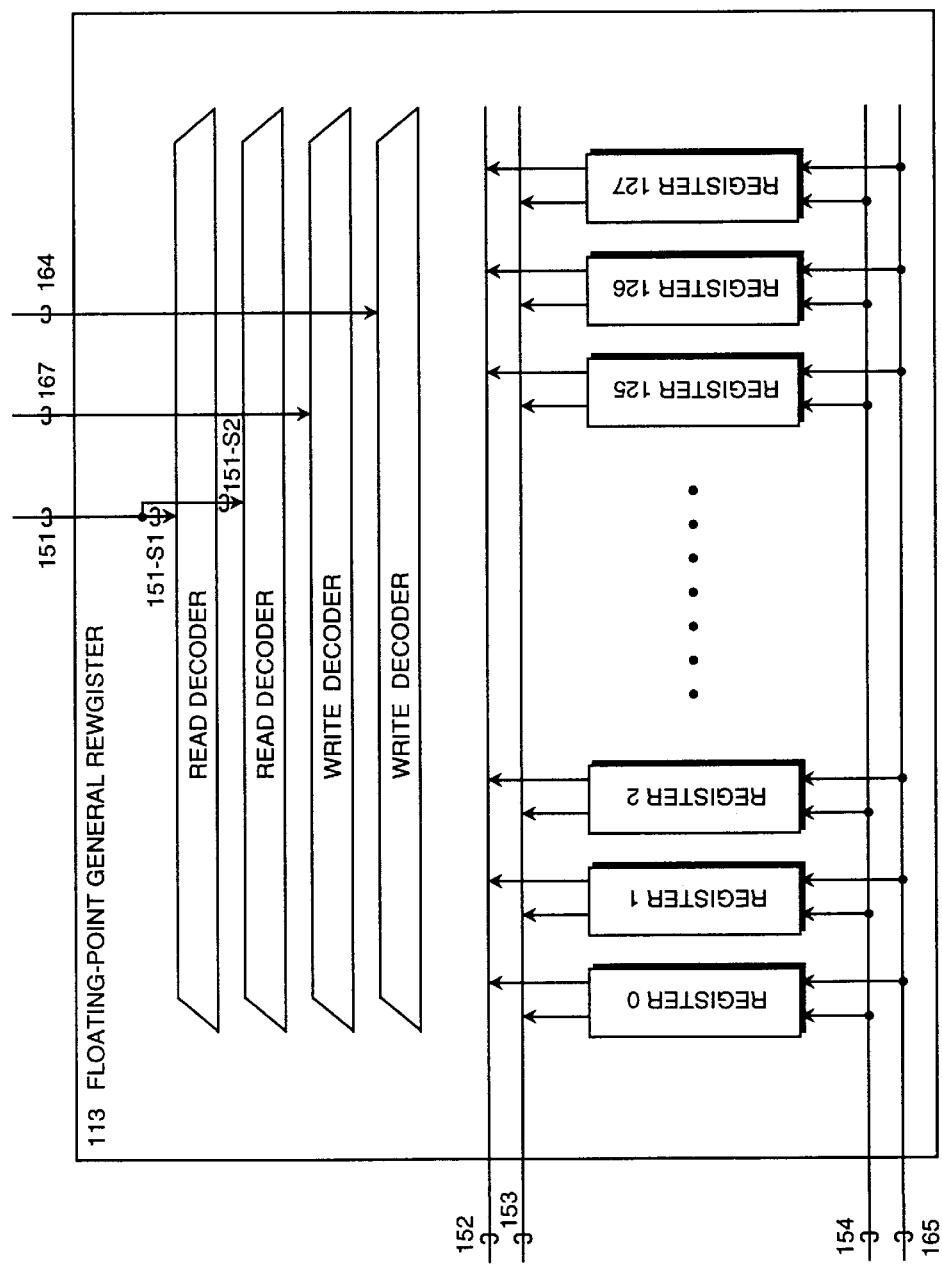
FIG. 3 is a circuit diagram showing a an example of a floating-point register.
Figure 4:
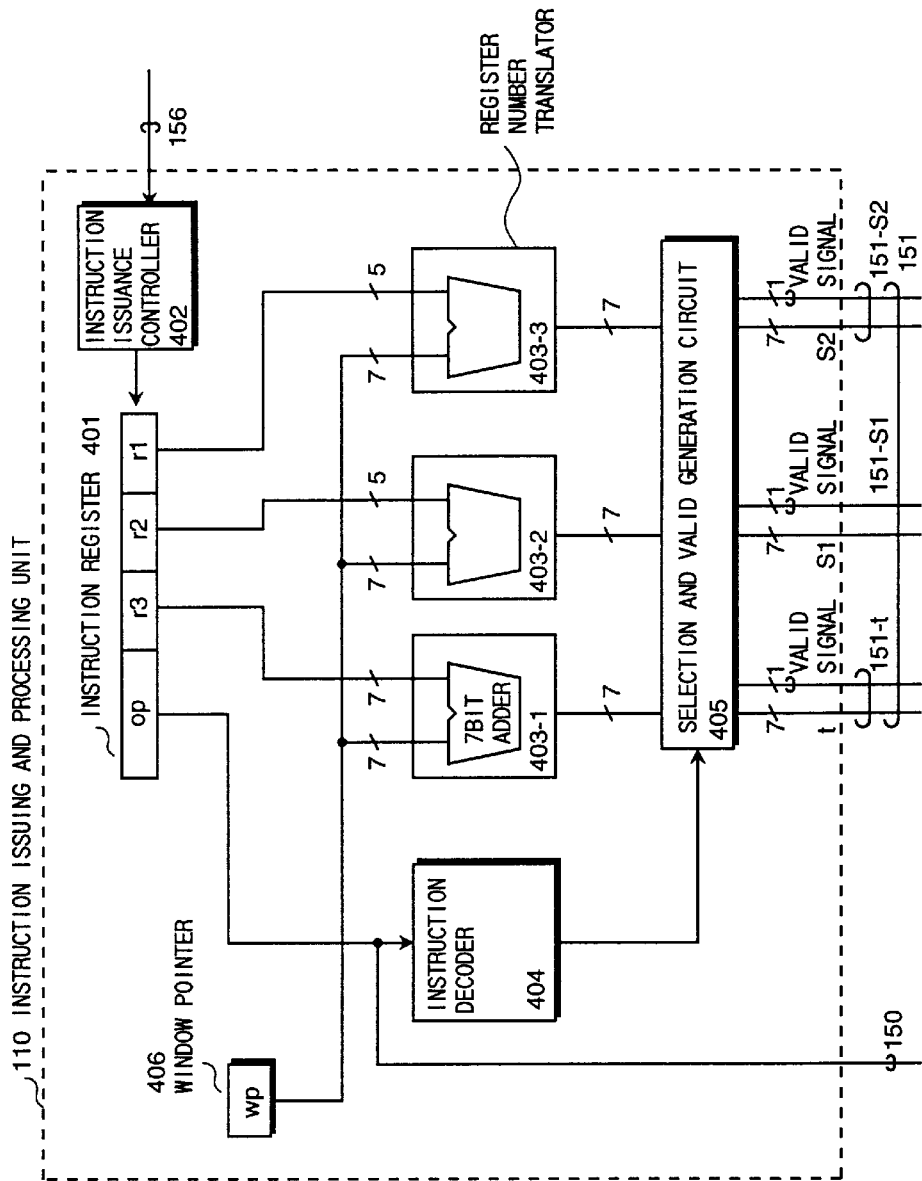
FIG. 4 is a schematic diagram showing how register number translation is carried out inside an instruction issuing and processing unit.
Figure 5:
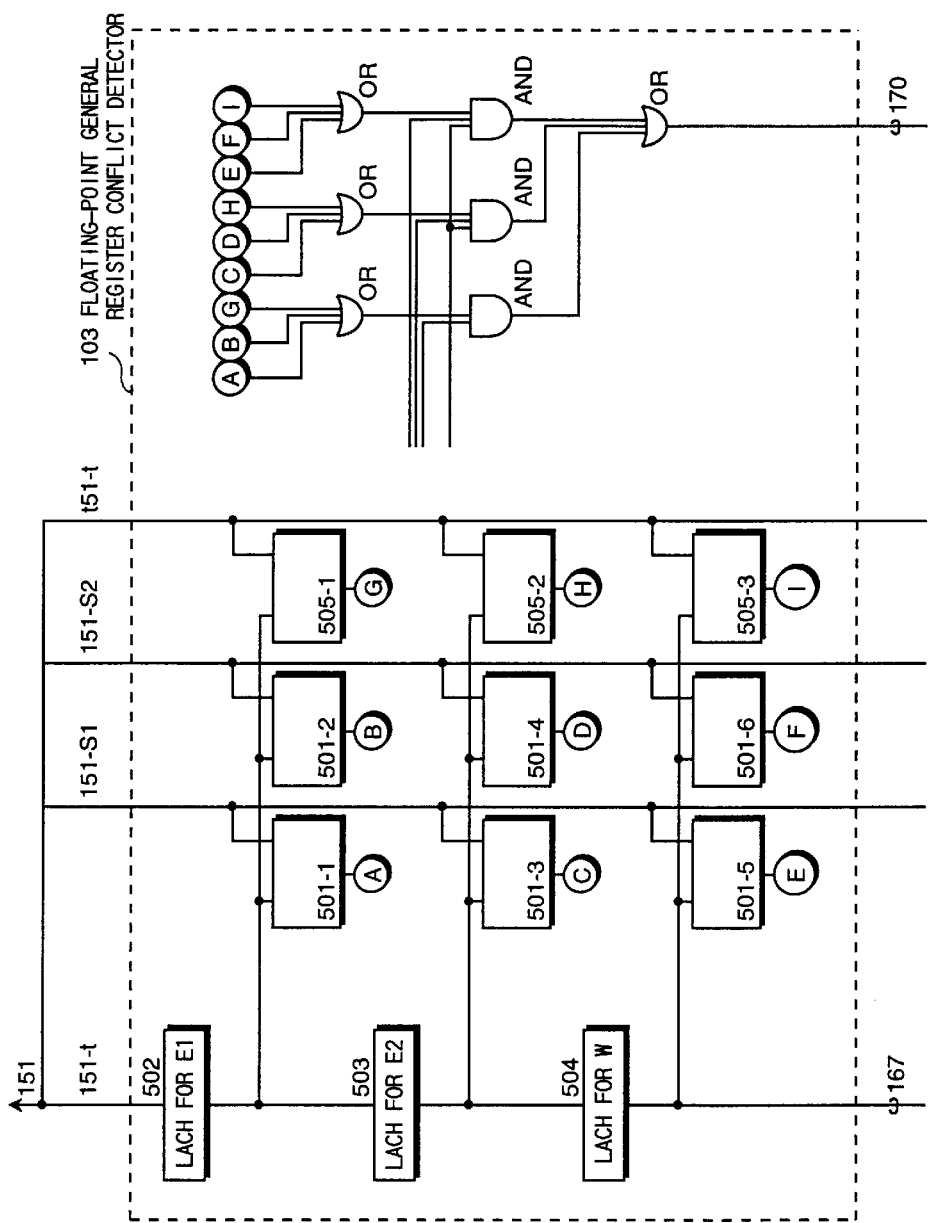
FIG. 5 is a circuit diagram of a floating-point general register conflict detector.
Figure 6:
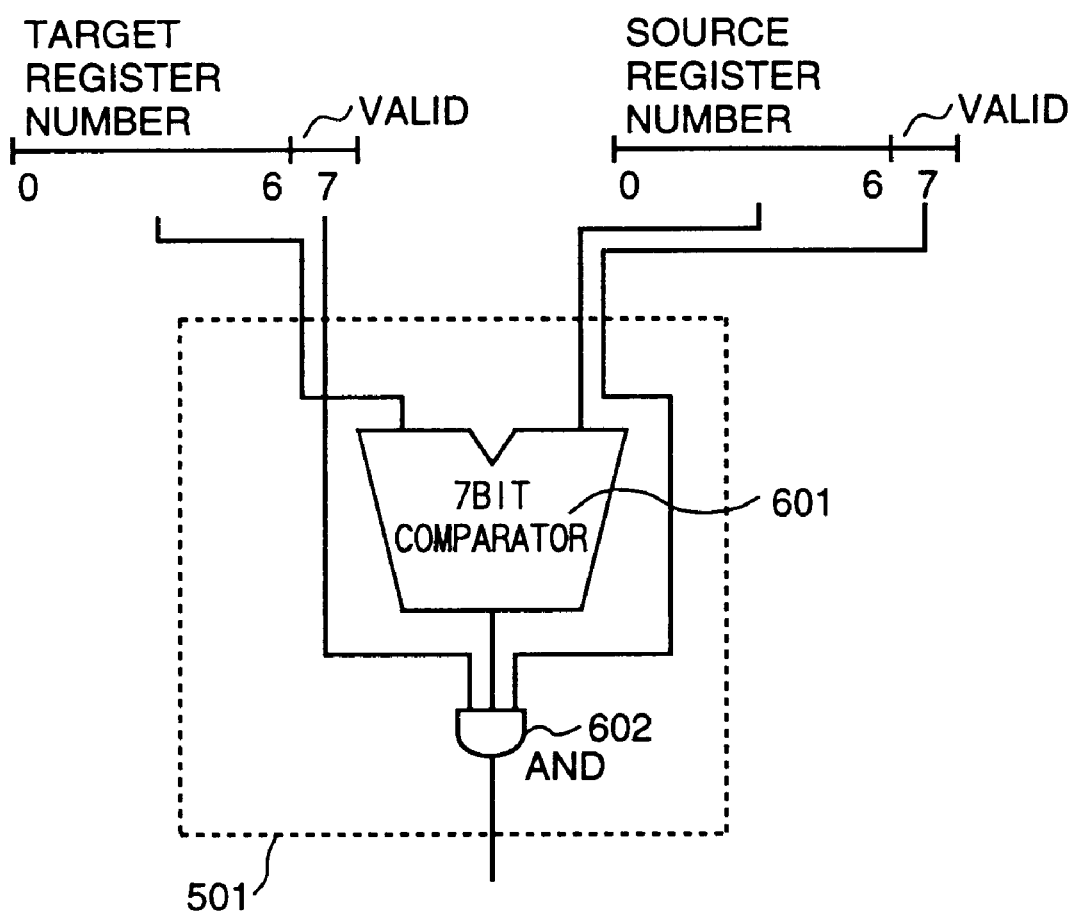
FIG. 6 is a circuit diagram of a comparator.
Figure 7:
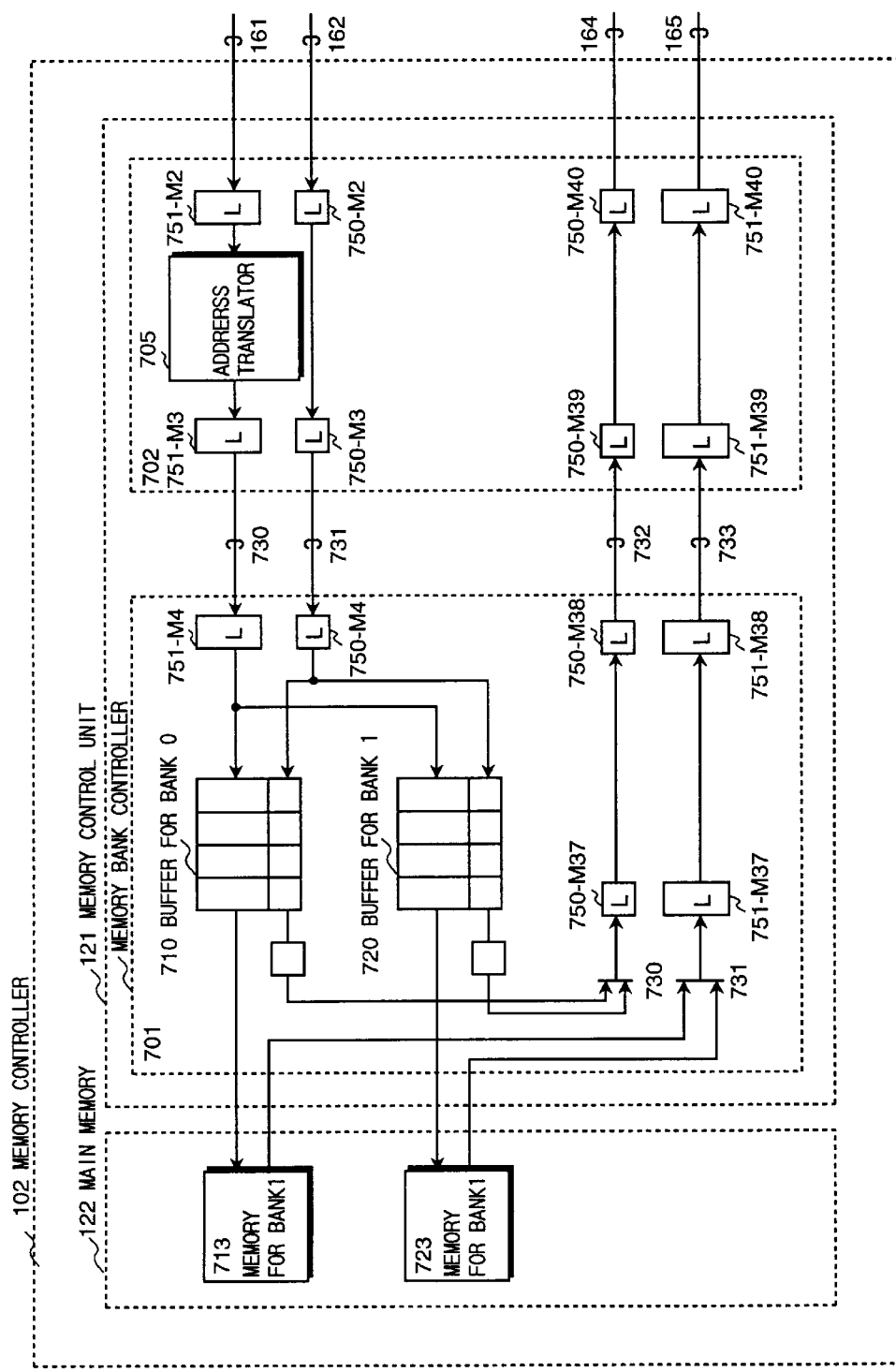
FIG. 7 is a circuit diagram of a memory controller.
Figure 8:
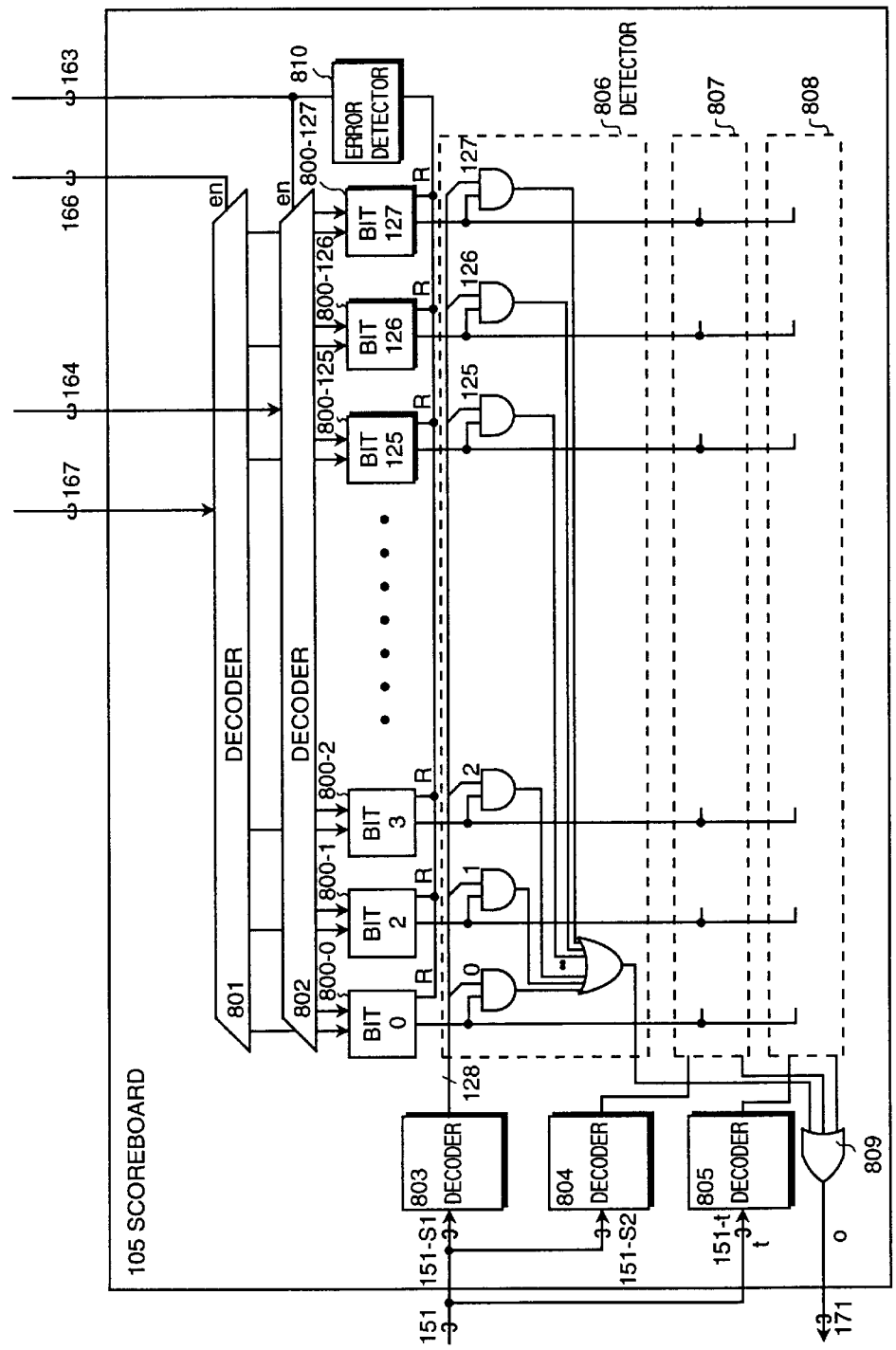
FIG. 8 is a circuit diagram of a scoreboard.
Figure 10:
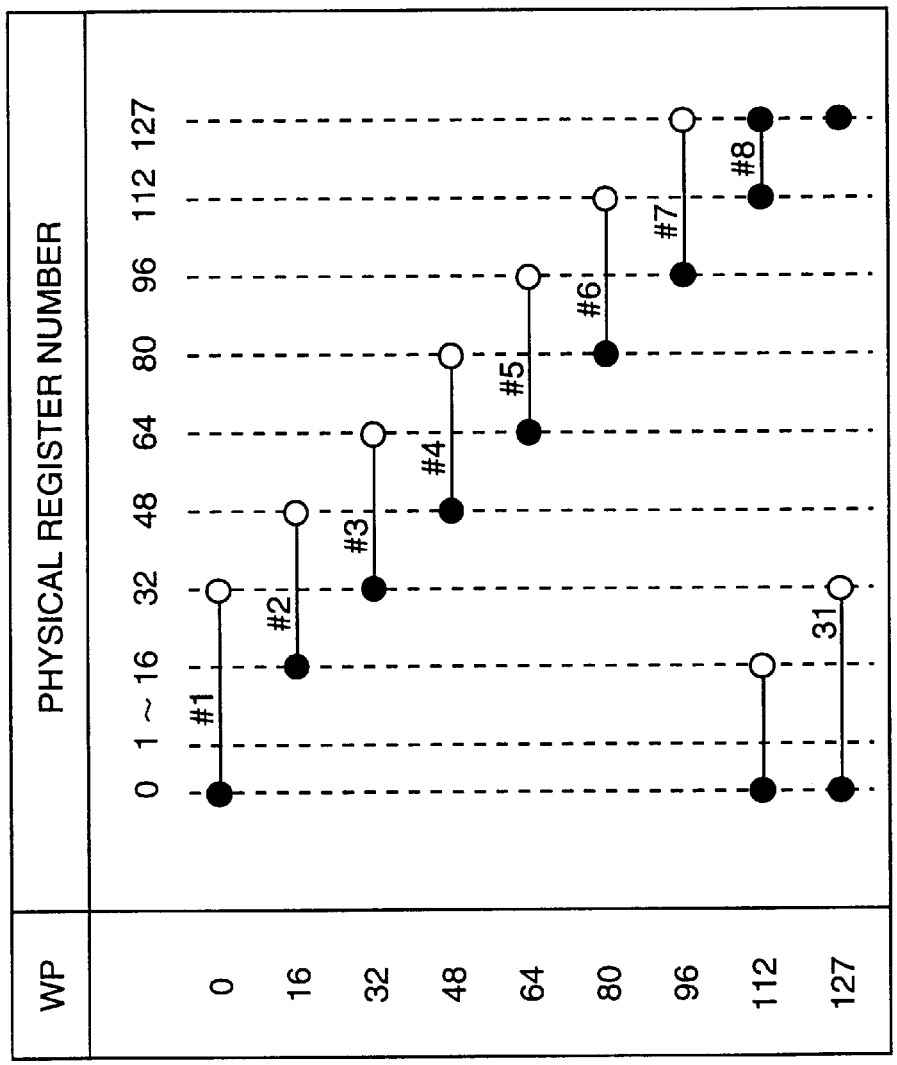
FIG. 10 is a diagram showing relations between register windows and window pointers.
Figure 11A:
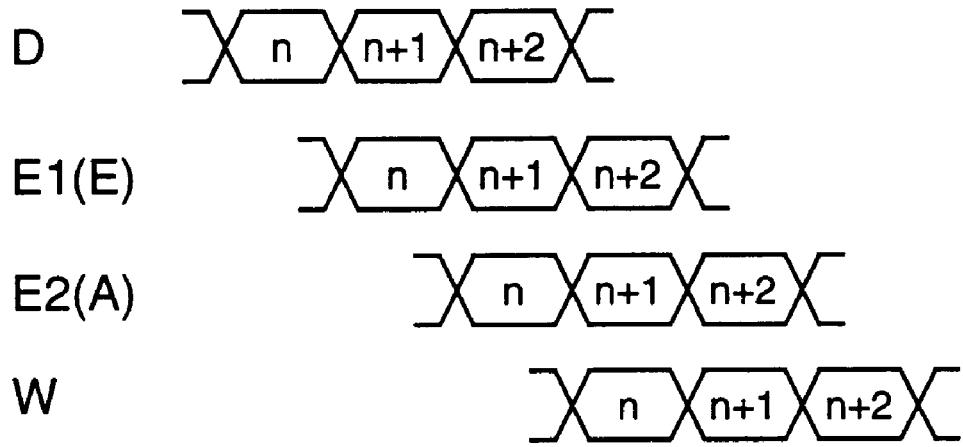
FIGS. 11A and 11B are diagrams showing basic operations of an instruction processing unit in connection with register conflict.
Figure 11B:
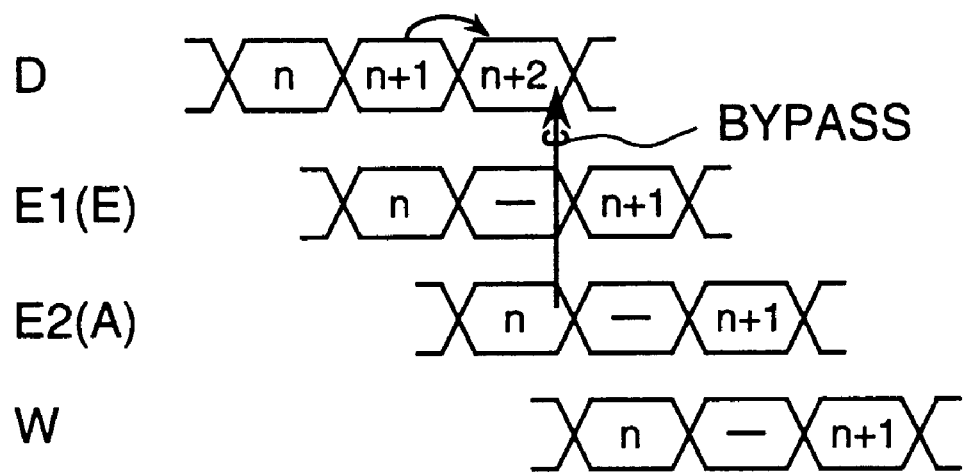
Figure 12:
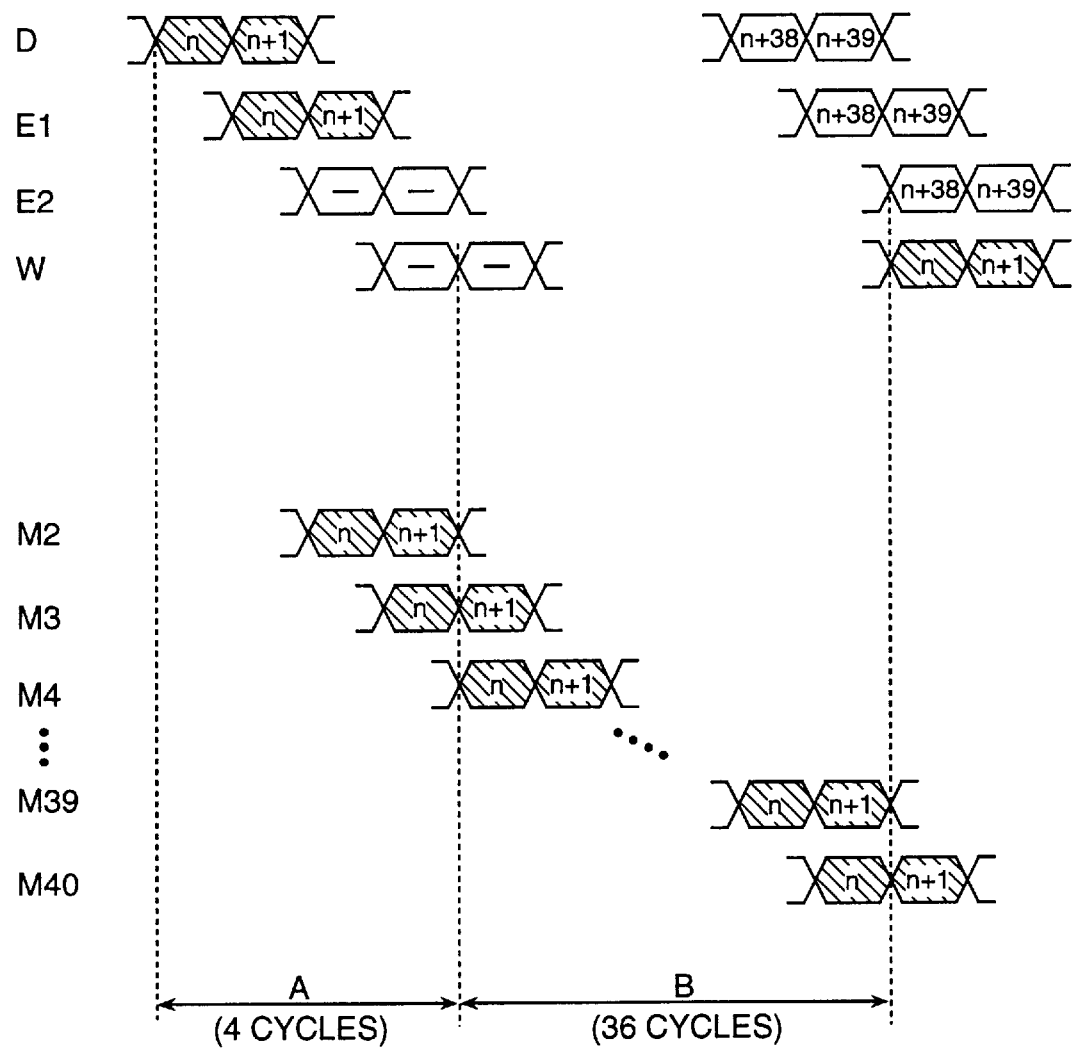
FIG. 12 is a diagram showing basic operations during long latency processing.
Figure 13:
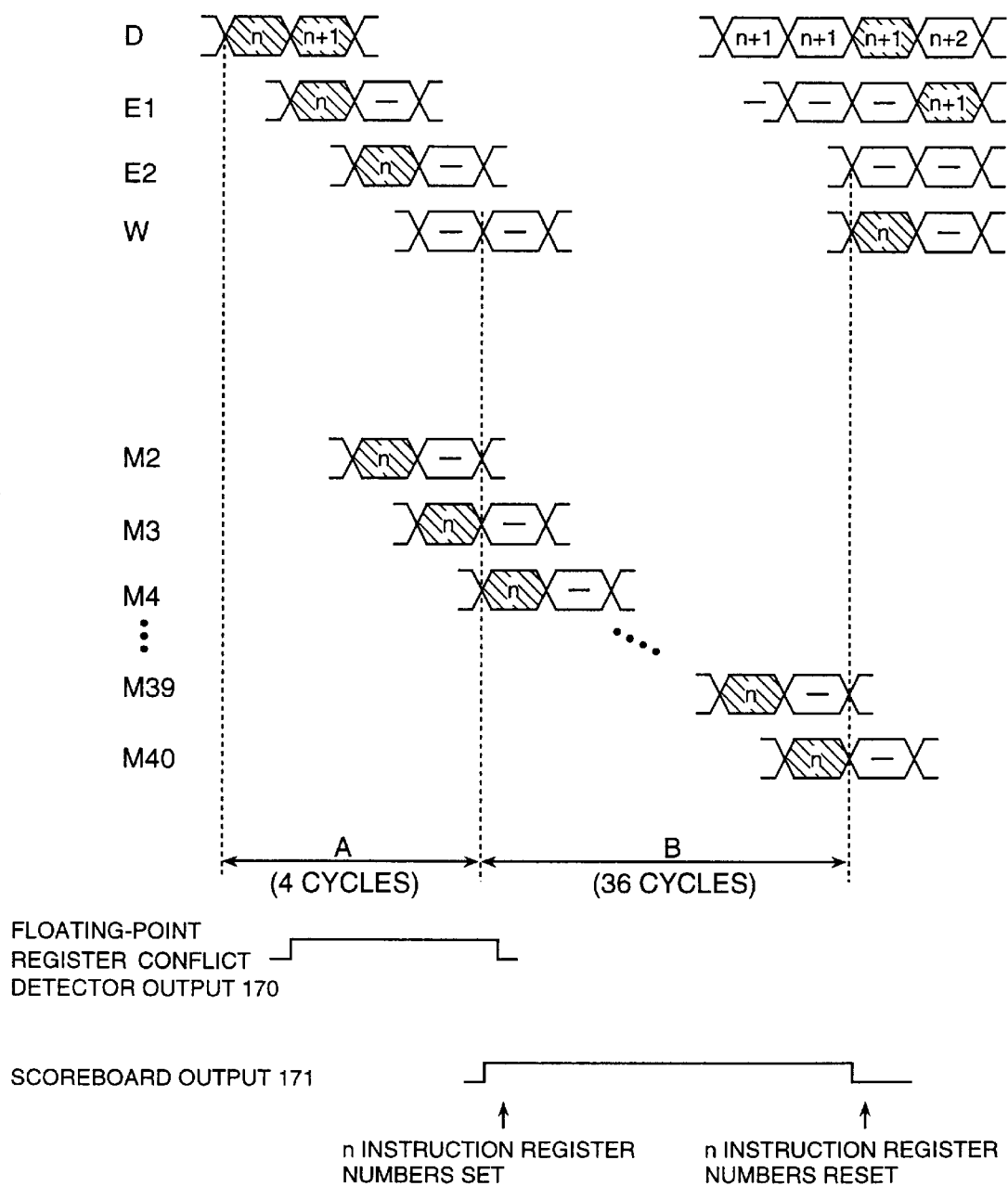
FIG. 13 is a diagram showing register conflict during long latency processing.

FIGS. 1 through 8 show a first embodiment of the invention as it is applied to a computer for scientific and technical computation. FIG. 1 shows the overall constitution of the computer for scientific and technical computation; FIG. 2 depicts a arithmetic unit; FIG. 3 shows a floating-point register; FIG. 4 illustrates how register number translation is carried out inside an instruction issuing and processing unit; FIGS. 5 and 6 shows a floating-point general register conflict detector; FIG. 7 shows memory controller; and FIG. 8 illustrates a scoreboard. In addition, FIG. 9 tabulates instruction sets for use with the embodiment; FIG. 10 depicts how physical register numbers are translated by use of register windows; FIGS. 11A and 11B illustrate basic operations of an instruction processing unit in connection with register conflict; and FIGS. 12 and 13 show basic operations and a register conflict during long latency processing.

The register constitution and instruction sets will now be described. Where long latency processes, such as main memory access operations, are to be hidden by memory pipeline processing, the number of configured registers can pose a bottleneck.

One solution to that problem is proposed illustratively in "Evaluating a Pseudo-Vector Processor Using a Register Window Scheme," an article in a periodical of the Information Processing Society of Japan, Vol. 34, No. 4, p. 669. The publication describes in detail a scheme wherein registers, referred to as a register window, are divided into a plurality of sets in order to increase the register count. The first embodiment adopts a register window scheme involving 128 registers.

FIG. 9 is a table that lists typical floating-point instruction sets for use with the first embodiment. In the table, FMUL and FADD represent a multiplication and an addition instruction, respectively. Symbols r1, r2 and r3 each denote a register number representing one of 32 registers. Added to a register number is a window pointer WP which points to a number representing 128 registers, whereby a physical register number is determined. In each of the two instructions, physical register numbers (r1+WP) and (r2+WP) designate registers from which data are read. The data is read-out and operated on, and the result is set to a physical register designated by physical register number (r3+WP).

FLD and FST are a general-purpose floating-point load and store instruction, respectively. In each of these instructions, a displacement (disp) is added to the data from an integer general register (GR). The added result is used as a memory address. With the FLD instruction, the data located at the appropriate address in memory is loaded into the register designated by physical register number (r3+WP). With the FST instruction, data is read from the register designated by physical register number (r1+WP) and stored into the calculated address in memory.

FPLD and FPST are basically the same in function as FLD and FST, except that FPLD and FPST are both extended instructions with r3' and r1' each capable of pointing to all 128 registers at once. In that way, the extended instruction provides direct access between main memory locations and floating-point registers. FWP is an instruction that updates the window pointer WP of the register window scheme.

Returning to FIG. 1, the overall constitution of the computer for scientific and technical computation includes an instruction controller 101, a memory controller 102, a floating-point register conflict detector 103, a long latency process detector 104 and a scoreboard 105. Also included are a first and a second interface unit. The first interface unit transfers a request signal 160, a memory address 161 and a register number 162 from the instruction controller 101 to the memory controller 102. The second interface unit transfers a response signal 163 returning data, data 165, and a data-receiving register number 164 from the memory controller 102 to the instruction processing unit 101.

How arithmetic instructions, such as FMUL and FADD, are carried out will now be described in conjunction with the instruction processing unit 101. An instruction is first placed in an instruction register 401 inside the instruction issuing and processing unit 110 shown in FIG. 4. Register numbers r1, r2 and r3 are computed by register number translators 403-1 to 403-3 through additions with a window pointer 406 in order to find physical register numbers. Illustratively, FIG. 10 shows physical register numbers in effect when the window pointer WP is 0, 16, 32, 48, 64, 80, 96, 112 and 127. An instruction decoder 404 decodes a given instruction to see if each register number field is effective. Using the decoded result, the instruction decoder controls a selection and valid generation circuit 405. The circuit 405 in turn outputs a register number with valid signal 151-s1 for source 1, a register number with valid signal 151-s2 for source 2, and a register number with valid signal 151-t for a target. A floating-point register 113 of FIG. 3 comprising 128 registers reads simultaneously the register contents designated by the source physical register numbers 151-s1 and 151-s2 from the instruction issuing and processing unit 110. The read-out register contents are output simultaneously onto lines 152 and 153. A floating-point arithmetic unit 111 shown in FIG. 2 receives two data items to be operated on from the lines 152 and 153 and places the data items into an input data latch 211. In the next cycle, an operation (E1) 201 is carried out and the result is forwarded to an intermediate data latch 212. In the next cycle, an operation (E2) 202 is performed and the result is put into a result storage latch 213. with this embodiment, the operations (E1) and (E2) are carried out in two cycles to obtain the result of addition or multiplication. One arithmetic instruction is processed in two latency cycles. The result 154 produced by the floating-point arithmetic unit 111 is placed into the floating-point register 113, whereby the processing is completed. FIG. 11A shows the basic operation timings of the arithmetic instructions. Pipeline processing proceeds in such a way that one instruction is processed in four cycles E, E1, E2 and W.

Below is a description of how a register conflict illustratively occurs between an arithmetic instruction being processed and a subsequent instruction. A typical program from which a register conflict results is as follows:

FADD r1, r2, r3
FMUL r3, r4, r5

The floating-point arithmetic unit 111 of this embodiment is of the two-latency-cycle type, as shown in FIG. 2. The floating-point arithmetic unit includes a short path 220 and selectors 221 and 222 to minimize any penalty stemming from the occurrence of a register conflict. After a one-cycle interlock upon register conflict, the data in question may be used. The interlock operation is described below.

FIG. 5 depicts a typical constitution of the floating-point register conflict detector 103. The detector 103 comprises latches 502, 503 and 504 for holding target register numbers 501-t coming from the instruction issuing and processing unit 110 for each pipeline stage; comparators 501-1 through 501-6 for comparing the target register number of each stage with source register numbers 151-s1 and 151-s2 corresponding to the instruction register 401 in the instruction issuing and processing unit 110; comparators 505-1 through 505-3 for comparing target register numbers 151-t; and a logic circuit for merging the comparator outputs. FIG. 6 depicts a detailed constitution of the comparator 501. The comparator 501 comprises a seven-bit comparator and an AND gate for AND'ing the comparator output with each "valid" signal.

While the FADD instruction is executing the E1 state, the latch 502 in FIG. 5 holds physical register number (r3+WP). The FMUL instruction is held in the instruction register 401. The output of the register 401 is the signal 151-s1 for source 1 constituting physical register number (r3+WP). Thus, the comparator 501-1 detects a register number coincidence and generates 1 as its output 170. The output of the register conflict detector 103 is sent to an instruction issuance controller 402 of the instruction issuing and processing unit 110 via OR logic, whereby the instruction of the instruction register 401 is held therein through one cycle. In the next cycle, the FADD instruction proceeds to stage E2 to place the physical register number into the E2 target latch 503. The comparator 501-3, comparing the signal 151-s1 from the instruction register 401 with the content of the target latch 503, detects a register number coincidence. However, the output 170 is enabled only for a long latency process instruction under control of the signal 511; and so the output 170 thus becomes 0 when masked by the logic circuit based on the signal 511. When the instruction controller 112 detects an imminent use of the computed result by the instruction held in the instruction register, the computed result is immediately forwarded from the short path 220 in the floating-point arithmetic unit 111 to the input data latch via the selector 221. This allows the FADD instruction to start operating on the correct input data in the next E1 cycle. FIG. 11B shows the timings involved. With the n-th instruction and the (n+1)th instructions placed into a single-cycle interlock as a result of register conflict, correct performance is guaranteed.

Comparators 505-1 through 505-3 in FIG. 5 are used for interlock control based on the relationship between the target number of the ongoing instruction and that of a subsequent instruction generally for interrupt handling purposes. The operations involved for these comparators are the same as those of the above-described comparators and will not be discussed further.

Below is a description of how the FLD and FPLD instructions are illustratively executed. FIG. 7 shows an example of the constitution of the memory controller 102. The memory controller 102 comprises a main memory 122 and a memory control unit 121. The memory control unit 121 includes a memory bank controller 701 and an address translation controller 702. Reference numerals 751-M2 through 751-M40 and 750-M2 through 750-M40 all designate pipeline control latches; 705 designates an address translator; 710 and 720 designates bank (0, 1) buffers for resolving the pipeline interlock due to a bank conflict; 711 and 721 denote latches for holding register numbers corresponding to the processes in bank memories; 713 and 723 denote the bank memories; and 730 and 731 denote selectors for selecting data and register numbers from the memory banks.

The FLD and FPLD instructions are each decoded in stage D and subjected to address calculation in stage E.

Subsequent operations are carried out by the memory controller 102. The instruction processing unit 101 transfers to the memory controller 102 a request signal 160 for reading data, a memory address 161, and a target register number 162 regarding a floating-point register. The register number 162 proceeds through the pipeline stages in the memory controller 102 in synchronism with instruction operations. Because the transferred memory address 161 is a logical address, it is translated into a physical address by the address translator 705. After that, the physical address 730 and register number 731 are sent to the memory bank controller 701 that controls the memory banks. This embodiment uses a memory arrangement composed of two interleaved banks. Either bank 0 or bank 1 is accessed depending on whether the physical address turns out to be an odd or an even number. In each bank, the processes are executed in the order in which they entered the respective bank buffers 710 and 720. At this point, the register numbers are also put into the bank buffers 710 and 720 for process synchronization. During bank memory access, the register numbers are placed into the latches 711 and 721 that hold the register numbers in synchronism with the processes in the banks. In that state, the register numbers wait for the access operations on the memories 713 and 723 to be finished. With the access completed, the selectors 730 and 731 are controlled so that the accessed data and the register numbers held until the end of the processing are output simultaneously and handed over to the pipeline control latches 751-M37 and 750-M37. Thereafter, the memory controller 102 returns to the instruction controller 101 the response signal 163 for returning data to the memory processing unit (the signal is not shown in FIG. 7, which indicates only data paths), data 165 read from the memory, and register number 164. The floating-point general register 113 in the instruction controller 101 receives the data 165 read from the memory and the target register number 164 of the floating-point register, and writes the data to the register designated by the register number. This completes the execution of the FLD and FPLD instructions.

FIG. 12 depicts typical operation timings of the FLD and FPLD instructions. The nth instruction and (n+1)th instructions are memory access instructions, and reference characters M2 through M40 represent pipeline processes carried out by the memory controller.

The memory controller 102 of this embodiment has a memory of two interleaved banks. To institute a full pipeline scheme with that memory requires the provision of at least p banks, p representing the number of cycles in which to access the memory banks. The interleaved bank arrangement leads necessarily to a bank conflict. In the event of a bank conflict, the sequence of requests from the instruction controller 101 differs from the sequence of responses from the memory controller 102. More specifically, suppose that the previous request is being held in the buffer 710 for bank 0 even as access to bank 0 by the n-th memory request is about to take place. In that case, when the (n+1)th memory request accesses bank 1 in the next cycle, the (n+1)th memory request is serviced earlier than the previous request, provided the buffer 720 for bank 1 is empty. The consistency of performance is guaranteed despite the fact that the sequence of processing by the memory controller 102 is variable. This is because the memory controller 102 addresses each pipeline process along with memory processing without holding any register number in the instruction controller 101, and returns the register number 164 at the time of process response.

Below is a description of what happens in the event of a register conflict between the FLD or FPLD instruction and a subsequent instruction. FIG. 8 illustrates an example of the constitution of the scoreboard 105, which includes one-bit registers 800-0 through 800-127 corresponding to 128 registers; a decoder 801 for fully decoding register numbers to be set; a decoder 802 for fully decoding the register number to be reset; a decoder 803 for fully decoding the register number for source 1 in the instruction register 401; a decoder 804 for fully decoding the register number for source 2 in the instruction register 401; a decoder 805 for fully decoding the register number for the target in the instruction register 401; a decoder 806 for checking to see if the value 1 is set in the register 800 for which the output signal from the decoder 803 is set; a detector 807 for checking to see if the value 1 is set in the register 800 for which the output signal from the decoder 803 is set; a decoder 808 for checking to see if the value 1 is set in the register 800 for which the output signal from the decoder 803 is set; an OR circuit 809 for OR'ing the outputs from the detectors 806, 807 and 808; and an error detector 810 for checking to see if any error has occurred in the memory controller 102.

As mentioned earlier, the FLD and FPLD instructions supplement the operations on the scoreboard 105 when they are executed. A set enable signal 166 is detected by the long latency process detector 104 shown in FIG. 1. With this embodiment, the set enable signal 166 is set to 1 when the FLD and FPLD instructions are decoded and each are found to be a long latency process instruction. The register number 167 to be set is given as a target register number for the FLD and FPLD instructions in the floating-point register conflict detector 103. This register number is logically the same as the register number 162 handed over to the memory controller 102. In the cycle next to stage W, the scoreboard 105 causes the decoder 801 to set to 1 the register 800 corresponding to the register number 167 to be set in accordance with the set enable signal 166. When the execution of the FLD and FPLD instructions is completed in the memory controller 102, the scoreboard causes the decoder 802 to set to 0 the register 800 corresponding to the register number 164 in accordance with the response signal 163 from the memory controller. That is, the value 1 is set in the registers 800 corresponding to the memory requests from the cycle next to stage W until the end of the processing. The register value 1 indicates that memory processing is in progress. The reason for a given register 800 to be set to 1 in the cycle next to stage W is that the register conflict detector 103 checks for any register conflict up to stage W while the scoreboard 105 checks for register conflict from the cycle next to stage W until the end of the processing, the detector 103 and scoreboard 105 thus working in collaboration with each other. This arrangement makes instruction control easier for the scoreboard 105 to carry out. The reason for this as follows: if an instruction is set to the scoreboard 105 in stage D and then nullified under the influence of the preceding instruction in a basic pipeline process (a branch, interrupt handling, etc.), the setting must be removed from the scoreboard 105, which requires constant watch on the pipeline operation. By contrast, if a given instruction is set to the scoreboard 105 in the stage next to stage W, the preceding instruction in the basic pipeline process no longer exists. This eliminates the need for complicated processes that supervise pipeline performance, such as nullifying of the instruction.

Described below is what happens if an instruction subsequent to the FLD and FPLD instructions set to the scoreboard 105 causes a register conflict with the preceding instructions. A typical program (r3' matches r3 after physical register number translation) from which a register conflict results is as follows:

FPLD (GR1, disp), r3' . . . n-th instruction
FMUL r3, r4, r5 . . . (n+1)th instruction FIG. 13 shows typical timings of the operations involved. The first three cycles, as discussed in connection with the register conflict of arithmetic instructions, are subject to the detection process by the floating-point register conflict detector 103 whose output 170 is used to hold the instruction in the instruction register 401. From the fourth cycle on, the scoreboard 105 checks for register conflict. The FPLD instruction causes the value 1 to be set to the register 300 corresponding to r3'. Meanwhile, physical register number (WP+r3) is output on the signal line 151-s1 with respect to the instruction register 401. That signal is fully decoded by the decoder 803 in the scoreboard 105. The detector 806 checks to see if the value 1 is set in the register 800 for which the output signal from the decoder 803 is set. In this case, the value 1 is set (i.e., conflict status). Thus, the output 171 of the scoreboard is 1, which keeps the instruction held in the instruction register 401. The output 171 is held at 1 unless and until the conflicting register 800 has its value reset to 0. When the register 800 is reset by the response signal from the memory controller 102, the output 171 is reset to 0, thereby allowing the FMUL instruction to be issued. That is, the FPLD and FMUL instructions in register conflict are interlocked for 39 cycles to ensure the correct performance. In this manner, the FMUL instruction is allowed to operate on the correct input data after execution of the FPLD instruction has come to an end. Whereas the above example has dealt with a register conflict involving the instruction immediately following the ongoing instruction, instructions are issued continuously as long as there is no register conflict between the ongoing FPLD instruction and any instructions issued subsequently thereto. Where an (n+m)th instruction is a register conflict instruction, instructions up to the (n+m−1)th instruction are issued consecutively; the (n+m)th instruction is held in the instruction register 401 until execution of the FPLD instruction is completed.

Below is another example of a program involving register conflict (r3' matches r3 after physical register number translation).
FPLD (GR1, disp), r3'
FMUL r4, r5, r3

This is an example in which the target register number of the FPLD instruction coincides with the target register number of the next instruction. Because the FMUL instruction is executed before the FPLD instruction with this embodiment, the result of the FPLD instruction remains at the end of the two instructions. This leads to an inconsistency in program execution sequence. The two instructions thus need to be interlocked to ensure correct performance. The comparators 505-1 through 505-3 in the register conflict detector 103 check for register conflict up to stage W; and the detector 808 of the scoreboard 105 checks for register conflict from the cycle next to stage W until the end of the processing. The detector and scoreboard thus operate in collaboration with each other.

The scoreboard 105 of this embodiment expects the response signal to be always accompanied by the register number 164 from the memory controller 102. If the register number 164 is not returned because of an error in the memory controller 102, the register 800 in the scoreboard 105 is not reset. In that case, a register conflict will occur and lead to a deadlocked state. That contingency is averted by having information concerning memory controller error included in the response signal 163 from the memory controller 102. If error information is detected by the error detector 810 from the signal 163, all registers 800 are reset and an error handling routine is started by the instruction controller. Thus, the deadlocked state involving the memory controller 102 is avoided while error handling is carried out.

What follows is a description of a second embodiment of the invention with a cache memory included in the memory controller 102. The cache memory scheme is a widely practiced technique for enhancing the speed of memory access. In the event of a cache memory hit, the memory access operation is carried out in short cycles (a short latency process); while, in case of a miss, the operation is executed over long cycles (a long latency process).

Figure 14:
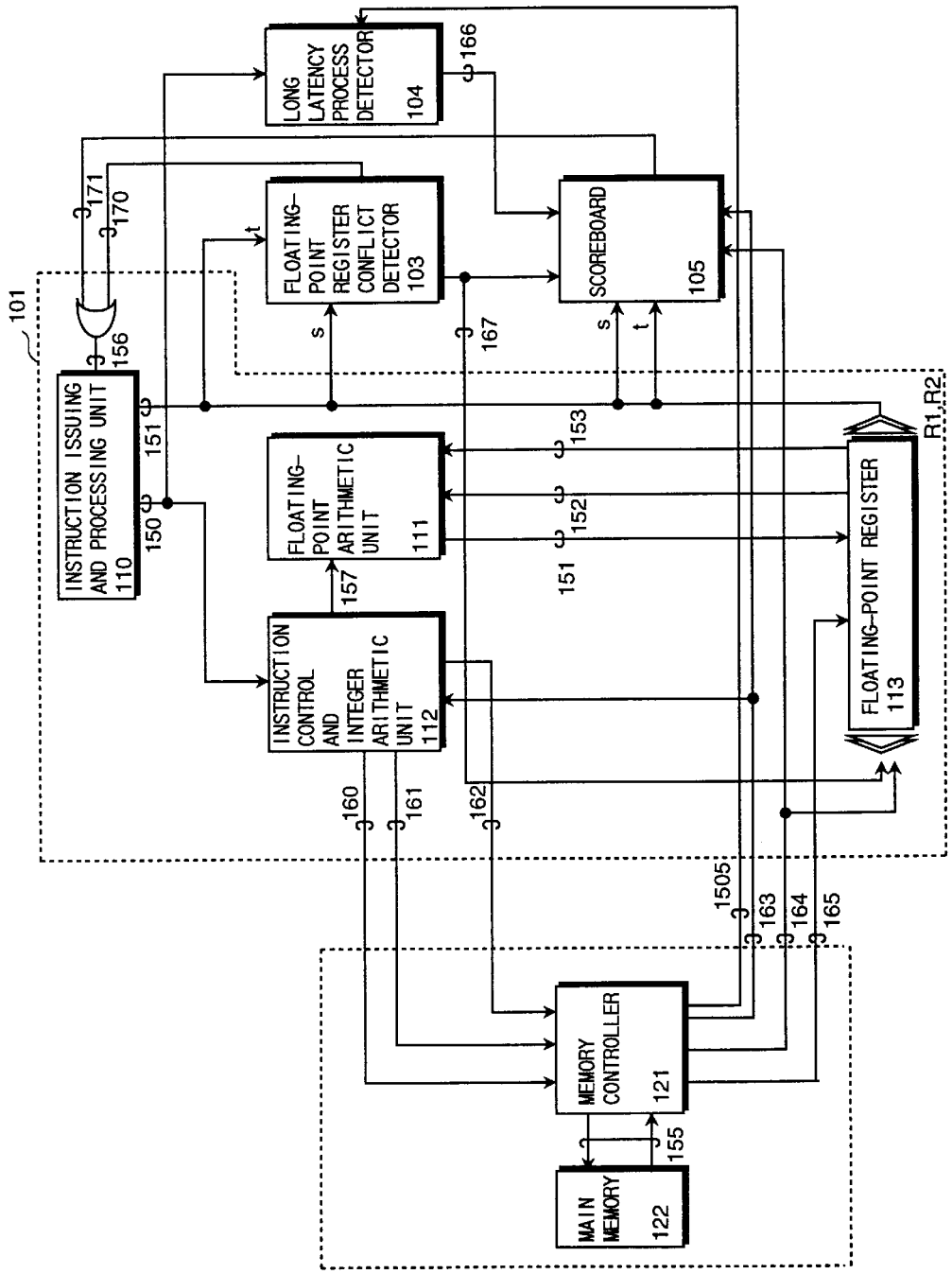
FIG. 14 is a block diagram showing the overall constitution of a computer for scientific computation.
Figure 15:
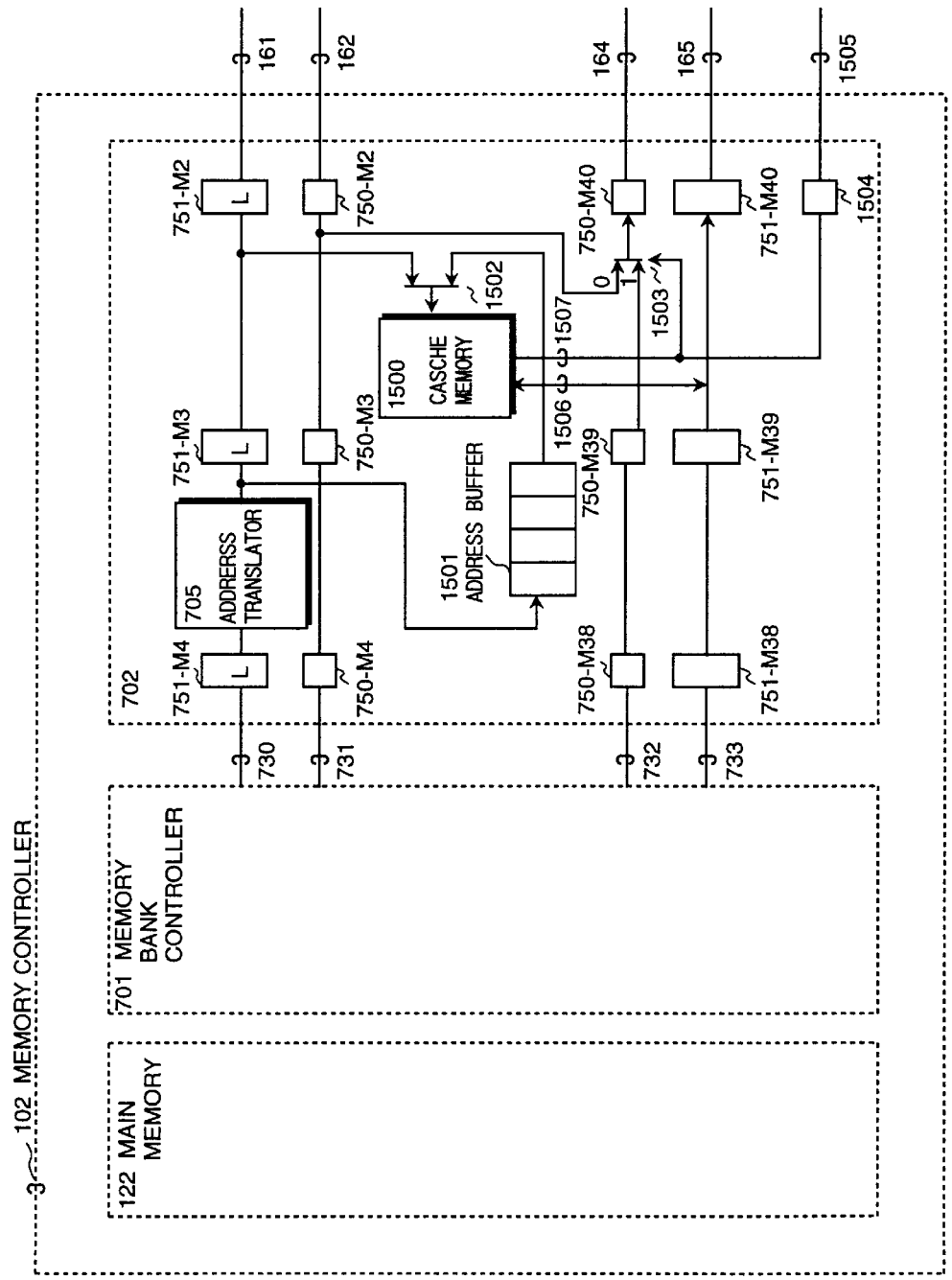
FIG. 15 is a circuit diagram showing a another memory controller.
Figure 16:
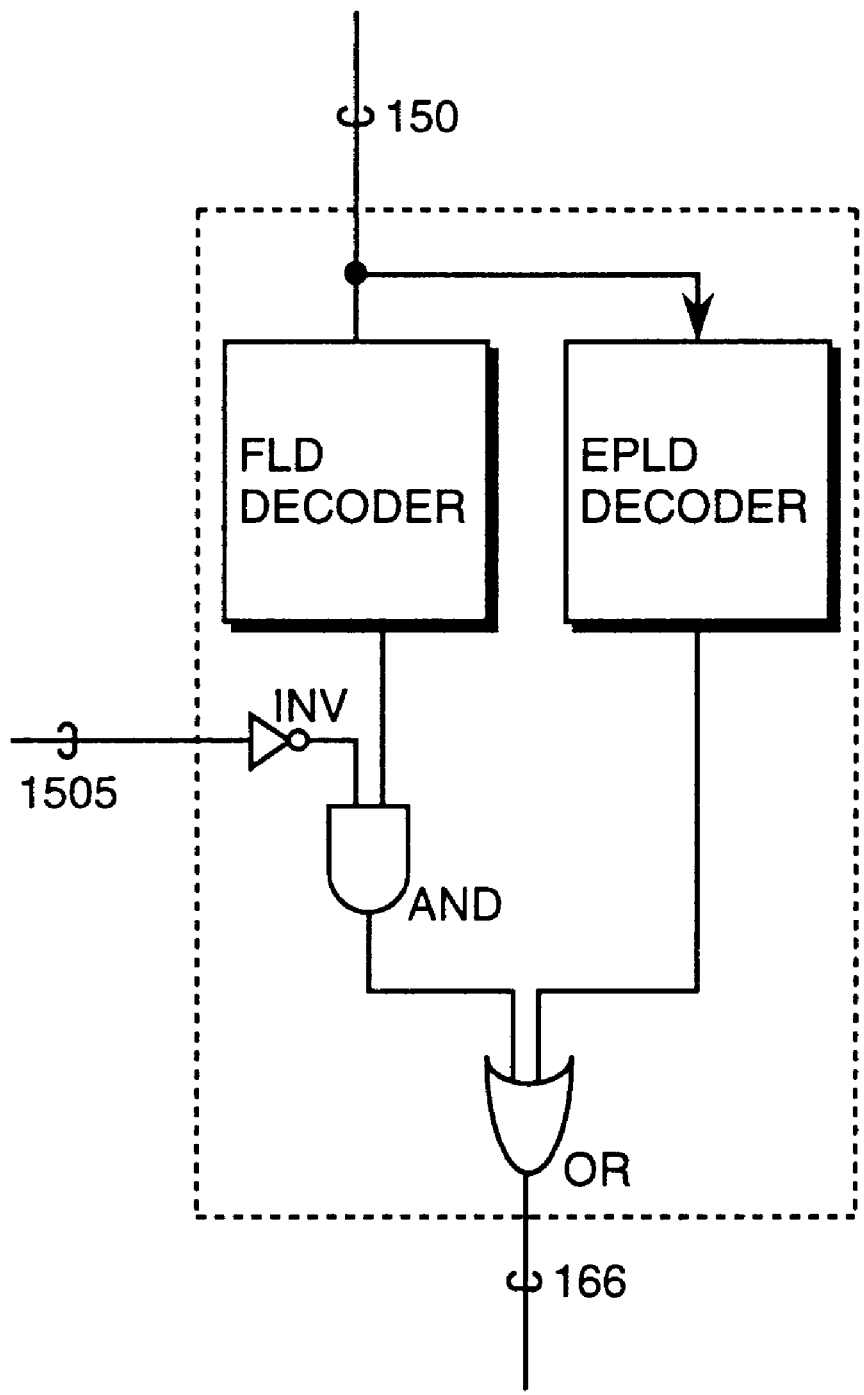
FIG. 16 is a circuit diagram of a long latency process detector.

Most of the components making up the second embodiment are the same as those of the first embodiment. The differences between the two embodiments are illustrated in FIGS. 14, 15 and 16. FIG. 14 shows an overall constitution of a computer for scientific computation embodying the invention; FIG. 15 depicts an example of the constitution of a memory controller having a cache memory; and FIG. 16 illustrates a long latency process detector. Because the first and second embodiments mainly differ in terms of the cache memory controlled inside the memory controller 102 and in terms of the interface of the memory controller, the description that follows regarding the operation of the second embodiment will concentrate on such differences. What makes the setup of FIG. 14 different from that of FIG. 1 is the addition of an interface unit 1505 indicating whether or not a cache hit has occurred. The setup of FIG. 15, evolving from the setup of FIG. 7, comprises a different unit 702. The unit 702 in FIG. 15 is a unit that provides a cache memory feature and performs address translation. For this purpose, the unit 702 additionally includes a cache memory 1500, an address buffer 1501, an address selector 1502, and a register number selector 1503.

The FLD instruction causes the instruction controller 101 to transfer a request signal 160 for reading data, a memory address 161 and a target register address 162 to the memory controller 102. The transferred memory address is placed in a latch 751-M2 for access to the cache memory 1500 via the selector 1502. If the cache memory 1500 contains data corresponding to the memory address, a cache hit takes place. The data is then set to a latch 751-M40 through a data line 1506. A signal 1507 indicating the hit in the cache memory 1500 is brought to 0, causing the register number in the latch 750-M2 to be transferred to a latch 750-M40. That is, a cache hit sets simultaneously the data latch 751-M40, the register number latch 750-M40 and the signal 1504 indicating the hit. The interface signals 164, 165 and 1505 are then returned to the instruction controller 101. Although not shown in FIG. 15, the hit signal causes processing of memory bank control to be halted. As with the first embodiment, the instruction controller 101 writes the data 165 to the register corresponding to the register number 164 to terminate the processing. The signal 1505 is sent to the long latency process detector 104 (see FIG. 14) notifying the latter of the cache hit. FIG. 16 shows how the long latency process detector 104 is structured. If the signal 1505 is 1, then the set enable signal 166, i.e., the output of the detector 104, becomes 0. It follows that the cache hit leaves no setting in the scoreboard.

Below is a description of what happens in the event of a cache miss. As with the first embodiment, a cache miss causes a physical address 730 translated by the address translator 705, as well as a register number 731, to be sent to the memory bank controller 701. Meanwhile, the interface signal 1505 notifies the long latency process detector 104 of the cache miss. This causes the long latency process detector 104 to output 1 as its output 166; and so the cache miss is set in the scoreboard. When the memory bank controller completes its processing, data 733 and a register number 732 are placed into pipeline latches 750-M38 and 751-M38. What makes the second embodiment distinct from the first embodiment is that data from the main memory is placed into the cache memory of the second embodiment. Thus, the data is written to the cache memory via 1506 in accordance with the address from the address buffer 1501. Concurrently, the applicable response signal, register number and data are returned through the interface signals 163, 164 and 165 to the instruction controller 101. As with the first embodiment, the instruction controller 101 writes the data 165 to the register corresponding to the register number 164 to complete the processing and resets the registers 800 in the scoreboard 105.

The other instruction, FPLD, works somewhat differently from the FLD instruction. The FPLD instruction is an instruction that places data from the main memory 122 directly to the register 113. For this reason, the cache memory in the memory controller is passed through during execution of the FPLD instruction. The address sent to the memory controller 102 is translated directly by the address translator 705 before being forwarded to the memory bank controller 701. Meanwhile, the long latency process detector 104 (see FIG. 16) generates 1 as its output 166 upon instruction decoding irrespective of the presence of a cache miss, and the value 1 is set to the scoreboard. The FPLD instruction does not place the data from the memory bank controller into the cache memory. Instead, the register number and data are returned to the instruction controller 101 through the interface signals 163, 164 and 165. As with the first embodiment, the instruction controller 101 writes the data 165 to the register corresponding to the register number 164, to complete the processing, and resets the registers 800 in the scoreboard 105.

The second embodiment performs the same pipeline process as with an arithmetic instruction (a short latency process) in the event of a cache hit, and carries out long latency processing only in the case of a cache miss. This means that even with a cache miss taking place under memory control, pipeline processes of subsequent instructions may be started successively as a long as register conflict does not exist. The long latency processes for gaining access to the main memory may thus be hidden behind the pipeline scheme.

What follows is a description of a third embodiment of the invention. The third embodiment is characterized by improvements in the interface between the memory controller and the instruction controller of the second embodiment.

Figure 17:
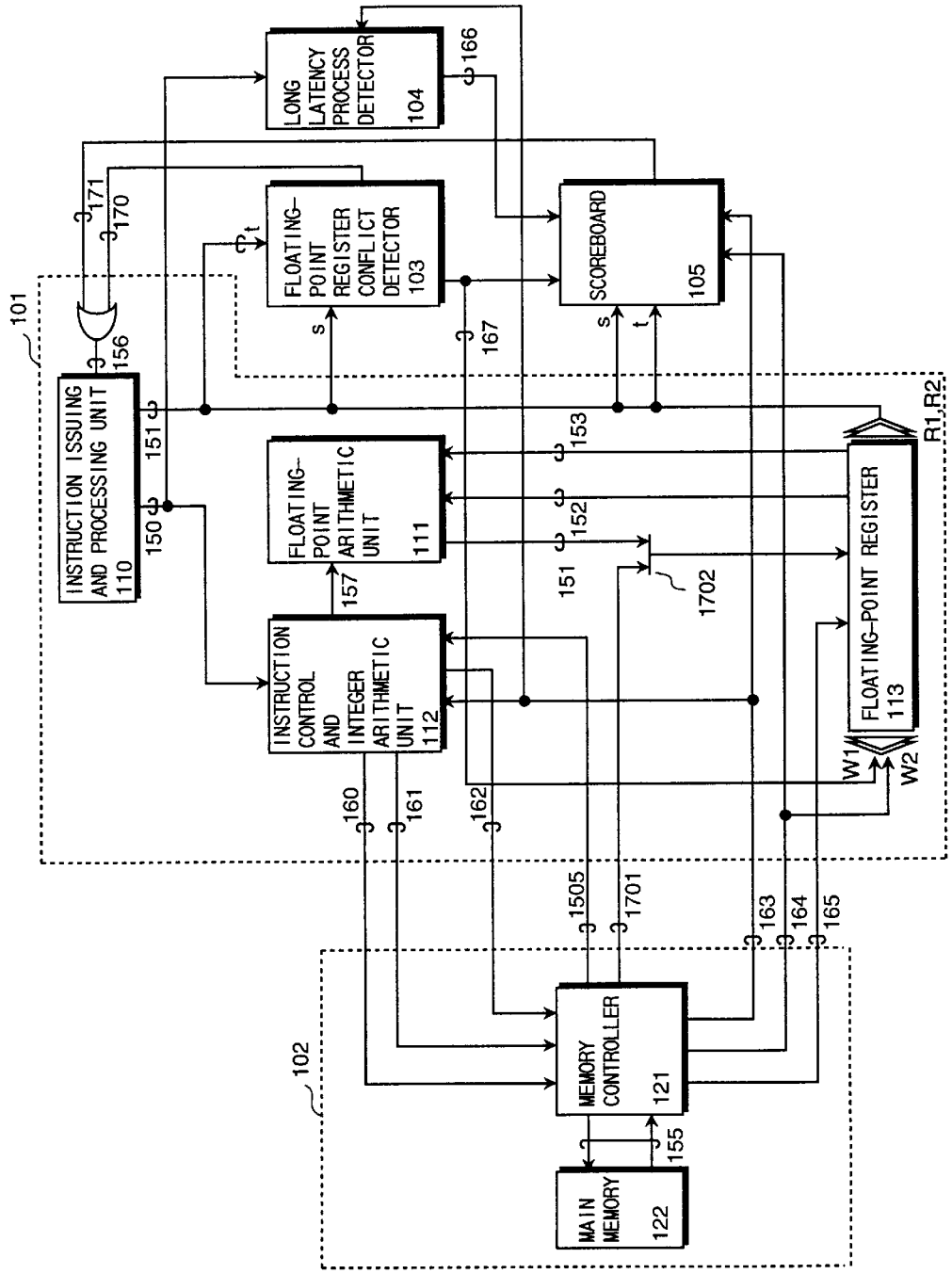
FIG. 17 is a block diagram showing the overall constitution of another computer for scientific computation.
Figure 18:
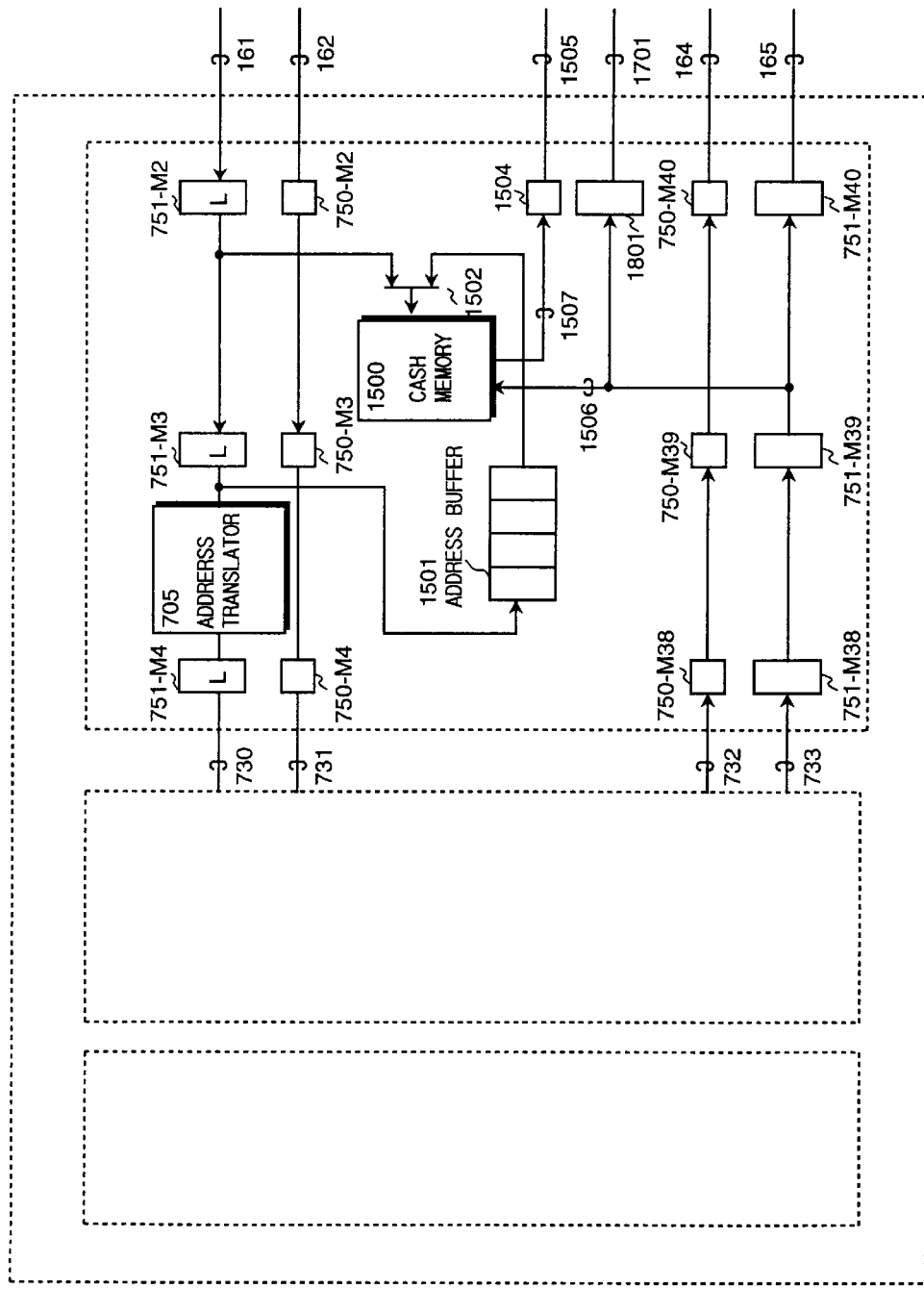
FIG. 18 is a circuit diagram showing a another memory controller.

Most of the components making up the third embodiment are the same as those of the second embodiment. The differences between the two embodiments are illustrated in FIGS. 17 and 18. FIG. 17 shows an overall constitution of another computer for scientific computation embodying the invention, and FIG. 18 depicts an example of the constitution of another memory controller comprising a cache memory. Because the second and third embodiments mainly differ in terms of the memory controller interface, the description that follows regarding the operation of the third embodiment will center on that particular difference. What makes the setup of FIG. 17 different from that of FIG. 14 is the addition to the interface of a unit 1701 for outputting data from the cache memory together with the signal 1505 indicating the occurrence of a cache hit.

The FLD instruction transfers a request signal 160 for reading data, a memory address 161 and a target register number 162 from the instruction controller 101 to the memory controller 102. The transferred memory address is placed in a latch 751-M2, which in turn causes the selector 1502 to access the cache memory 1500. If the cache memory 1500 contains data corresponding to the memory address, a cache hit takes place. The corresponding data is then set to a latch 1801 over a data bus 1506. In the event of a cache hit, both the data 1801 and the signal 1504 indicating the hit are set simultaneously. The response is returned to the instruction controller 101 through the interface signals 1701 and 1505. As shown in FIG. 17, the instruction controller 101 causes the selector 1702 to select either the signal 151 outputting the computed result or the data 1701 from the memory controller. The selected data is written to the register 113. At this point, the target register number is supplied from a path 167 from arithmetic operation. The operation in case of a cache miss and the operation of the FPLD instruction are the same as those of the second embodiment and will not be discussed further. One advantage of the third embodiment is that the memory controller need not return the register number in effect at the time of a cache memory hit (a short latency process). That is, the memory controller is structurally simplified in that it guarantees the register number only for long latency processing.

Although the above three embodiments were all shown to be associated with single pipeline processing, the invention is not limited thereto. The invention also may be applied advantageously to long latency process instructions dealt with beyond basic pipeline processes by a super-scalar processor that issues n instructions simultaneously.

Figure 20:
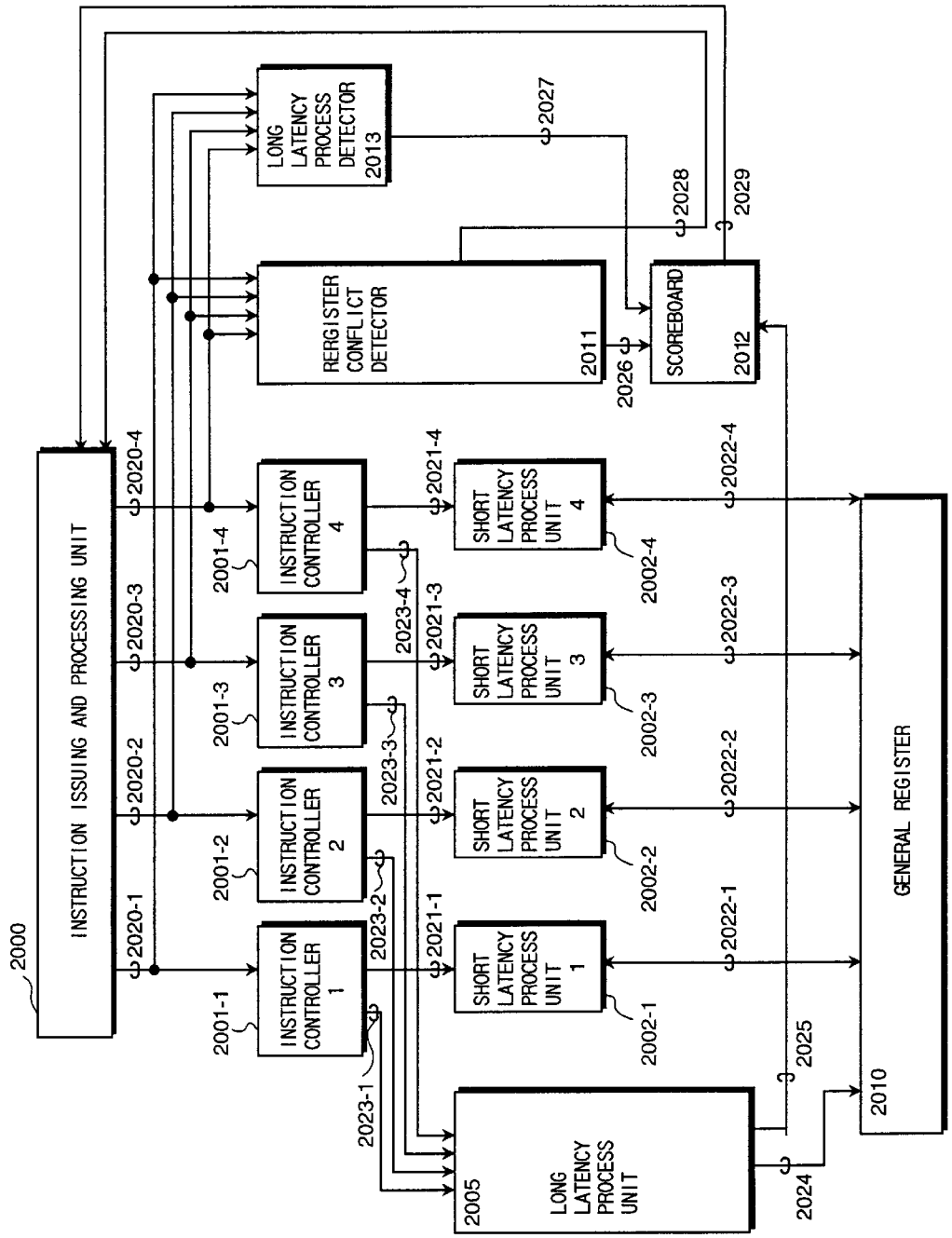
FIG. 20 is a block diagram of a four-instruction superscalar type processor embodying the invention.

FIG. 20 outlines a four-instruction super-scalar type processor. The processor comprises an instruction issuing and processing unit 2000 for issuing instructions, instruction controllers 2001-1 through 2001-4 that receive and control the instructions from the instruction issuing and processing unit, short latency processing units 2002-1 through 2002-4 for carrying out short latency processes, a long latency processing unit 2005 for performing long latency processing, a general register 2010 that holds a plurality of data items used in long and short latency processes, a register conflict detector 2011 for detecting register conflict in short latency processes, a long latency process detector 2013 that checks to see if the content of a given instruction involves a long latency process, and a scoreboard 2012 indicating register conflict in long latency processing.

The instruction issuing and processing unit 2000 supplies four instructions simultaneously to the instruction controllers 2001-1 through 2001-4 through lines 2020-1 through 2020-4. If the contents of the supplied instructions are found to denote short latency processes, the instruction controllers 2001-1 through 2001-4 control the respective short latency processing units 2002-1 through 2002-4 using control signals 2021-1 through 2021-4. If the supplied instructions denote long latency processes in their contents, the long latency processing unit 2005 is controlled by use of control signals 2023-1 through 2023-4.

The register conflict detector 2011 checks for register conflict about all registers used by the four instructions. If a register conflict is detected, the register conflict detector causes the instruction issuing and processing unit 2000 to stop the issuing of further instructions using a signal 2028. The scoreboard 2012 has the same function as its counterpart in FIG. 19.

In the inventive super-scalar type processor described above, that processes a plurality of instructions in parallel, the register conflict detector and the scoreboard separately detect register conflict while operating in collaboration. The embodiment achieves full pipeline control of long latency processing with simplified control logic while minimizing any increase in the scale of the necessary hardware.

With further circuit integration thanks to recent LSI technology developments, there may be provided a one-chip microprocessor comprising part of the instruction controller and memory controller. As shown in FIGS. 7, 15 and 18, the memory controller may be divided into desired stages in terms of latches. In such a setup, all cross-sections of the divided stages require terminals acting as an interface for transferring and returning register numbers.

Specifically, if the one-chip microprocessor is designed to include parts up to the memory bank controller in FIG. 18, there arises a need for LSI pins (i.e., terminals) constituting the interface 731 for transferring register numbers, as well as the interface 732 for returning register numbers.

Figure 21:
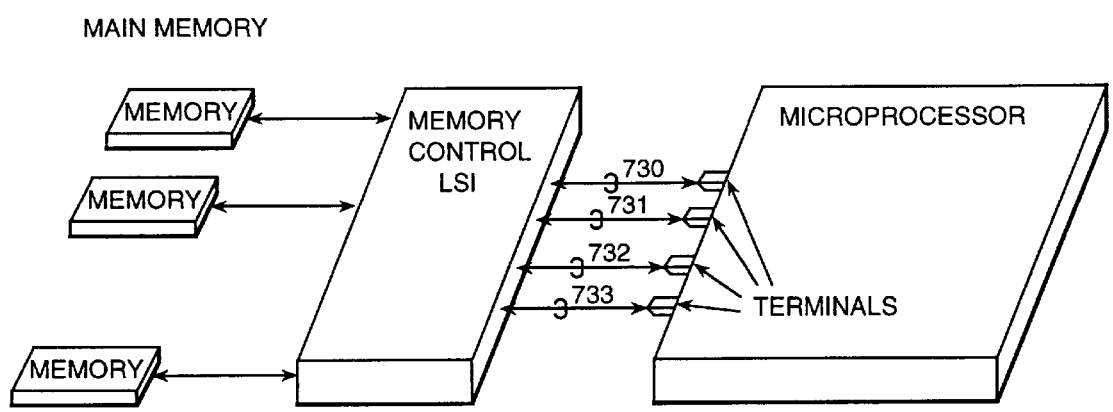
FIG. 21 is a schematic diagram showing how the memory controller of FIG. 18 is connected.

FIG. 21 schematically shows how the memory controller of FIG. 18 is illustratively implemented in a chip connection environment. In this case, terminals or wires are needed to connect the processor with the memory control chip in order to transfer request signals, response signals, addresses and data through the interface.

As one benefit of the invention, register conflict is eliminated from short and long latency processing.

Another benefit of the invention is that it achieves high-speed pipeline processing while taking advantage of efficient register usages.

A further benefit of the invention involves reducing the scale of the physical components for detecting a register conflict.

As an even further benefit, the invention implements register conflict detection logic control without resorting to complicated control features.

Using the register conflict detector, i.e., primary register detection means, the invention detects register conflict between an instruction to be subjected to pipeline processing and all instructions up to the n-th cycle. This makes it possible to start executing pipeline processes consecutively over a period excluding long latency processing and free of register conflict.

Using the register detection scoreboard, i.e., another register detection means, the invention detects register conflict between the instruction being processed over a period ranging from the (K+1)th cycle to the m-th cycle on the one hand, and a subsequent instruction to be subjected to pipeline processing, on the other hand. This makes it possible to start executing pipeline processes successively over a long latency process period free of register conflict.

As another benefit of the invention, two long latency process instructions may be executed in pipeline processing as long as there is no register conflict therebetween.

According to the invention, a register conflict detector controls pipeline processing over a period where pipeline control is likely to be disturbed by a branch instruction or interrupt handling (i.e., from the first to the K-th cycle); while the register conflict scoreboard controls pipeline processing over a period where pipeline control remains stable (i.e., from the (K+1)th to the m-th cycle). This feature permits full pipeline control of long latency processing with simplified control logic while minimizing any increase in the scale of the necessary hardware.

Within the interface unit of the inventive processor, request and response signals are processed asynchronously. This allows long latency process instructions (in which response signal sequence can vary) to start executing pipeline processes successively over a period where register conflict is absent during long latency processing.

Furthermore, the interface unit of the invention, which does not ensure the consistency of an instruction execution sequence, eliminates excess interlock in the case of register conflict between the completed instruction and any subsequent instruction to be subjected to pipeline processing inside the instruction controller, whereby the overhead of pipeline processing is reduced.

What is claimed is:

1. A data processing apparatus, comprising:

a plurality of memories which store data;

a processor which has registers for storing data, and which outputs an address and a register number for reading data from said memories;

at least two data buses connected to said memories; and a memory controller which controls said memories, wherein said memory controller comprises:

a plurality of buffers provided for said at least two data buses for storing a plurality of register numbers output from said processor, a first selector which selects one of data transmitted on said at least two data buses, and a second selector which selects a register number corresponding to said data selected by said first selector, wherein, based on said address output from said processor, said memory controller reads data from memories, and outputs to said processor said data selected by said first selector and said register number selected by said second selector, to be stored in one of said registers of said processor corresponding to said register number.

2. A data processing apparatus according to claim 1, wherein said memories and said memory controller are mounted on a semiconductor chip.

* * * * *